United States Patent
Liao et al.

(10) Patent No.: US 7,107,039 B2
(45) Date of Patent: Sep. 12, 2006

(54) MOBILE NETWORK CONTENT BASED CHARGING AND ACCESS CONTROL SYSTEM

(75) Inventors: Sheng-Hsuan Liao, Taipei (TW); Chia-Jung Liang, Taipei (TW)

(73) Assignee: Far Eastons Telecommunications Co., Ltd., Taipei (TW)

( * ) Notice: Subject to any disclaimer, the term of this patent is extended or adjusted under 35 U.S.C. 154(b) by 227 days.

(21) Appl. No.: 10/893,247

(22) Filed: Jul. 19, 2004

(65) Prior Publication Data
US 2005/0090230 A1 Apr. 28, 2005

(30) Foreign Application Priority Data
Oct. 28, 2003 (TW) ............................... 92109293 A

(51) Int. Cl.
*H04M 11/00* (2006.01)
*H04M 15/00* (2006.01)

(52) U.S. Cl. ..................... 455/406; 455/405; 455/407; 455/408; 379/114.03; 379/114.2; 379/126

(58) Field of Classification Search ........ 455/405–411; 379/111–134, 144.01; 370/254, 352
See application file for complete search history.

(56) References Cited

U.S. PATENT DOCUMENTS

| 6,535,727 | B1 * | 3/2003 | Abbasi et al. | 455/406 |
| 2002/0187775 | A1 * | 12/2002 | Corrigan et al. | 455/414 |
| 2004/0125755 | A1 * | 7/2004 | Roberts | 370/259 |
| 2006/0058006 | A1 * | 3/2006 | Hurtta et al. | 455/405 |

* cited by examiner

*Primary Examiner*—George Eng
*Assistant Examiner*—Michael Thier
(74) *Attorney, Agent, or Firm*—Rosenberg, Klein & Lee

(57) ABSTRACT

The invention provides an accurate, effective, and efficient system for content based charging, access barring, and network browsing, for pre-paid and post-paid subscribers of a wireless mobile communication network system comprising a gateway general packet radio service support node with service based content charge module; a separate WAP gateway for post-paid and pre-paid subscribers; IP, domain name and URL white list filtering; call detail records; a mediation gateway; data warehouse; and billing system. Access to the internet or free domain networks are efficiently controlled and content charges are accurately billed for both pre-paid and post-paid subscribers.

18 Claims, 20 Drawing Sheets

MOBILE NETWORK CONTENT BASED CHARGING AND ACCESS CONTROL SYSTEM

BACKGROUND OF THE INVENTION

1. Field of the Invention

The present invention relates to mobile internet access. More specifically, the present invention discloses an accurate, effective, and efficient system for content based charging, access barring, and network browsing, for pre-paid and post-paid subscribers of a wireless mobile communication network system.

2. Description of the Prior Art

With the rise in popularity of the internet and the technical advancements of mobile telephones, demand for wireless access to internet content is growing. Wireless access to the internet allows users, for example, to get their email or play online games, similarly to what they are provided with their office or home computer.

Currently, payment for the internet content is either by paying in advance or being billed after. Paying in advance is convenient for users concerned about controlling costs. Service is only provided for the amount paid in advance. This prevents unexpected or undesirable expense to the user. However, paying in advance is often inconvenient as the available balance is difficult for the user to monitor.

Paying after the service is convenient for users as access is fully available. However, use of services that is not carefully monitored can result in a large amount of money due after billing.

Furthermore, for the service and content providers, achieving a balance between convenience and quality of service to the user and proper billing and ease of system maintenance for the providers, is difficult to achieve.

Therefore, there is need for a system that efficiently controls access to the internet or free domain networks and accurately bills content charges for both pre-paid and post-paid subscribers of a wireless mobile communication network system.

SUMMARY OF THE INVENTION

To achieve these and other advantages and in order to overcome the disadvantages of the conventional method in accordance with the purpose of the invention as embodied and broadly described herein, the present invention provides an accurate, effective, and efficient system for content based charging, access barring, and network browsing, for pre-paid and post-paid subscribers of a wireless mobile communication network system.

Access to the internet or free domain networks are efficiently controlled and content charges are accurately billed for both pre-paid and post-paid subscribers. Additionally, a convenient and high quality service is provided to the user and the providers are given a proper billing solution that is efficiently maintained.

The present invention comprises: a gateway general packet radio service support node (GGSN) with service based content charge module (SBCC) and wireless application protocol (WAP) gateway IP filtering; a WAP gateway with a URL white list for pre-paid subscribers; a URL white list on a mediation gateway (MD) and the WAP gateway; and an MD comprising a GGSN call detail record (G-CDR) with Service Class, a WAP-CDR, and a URL white list.

A separate WAP gateway is provided for post-paid and pre-paid subscribers in a URL based configuration. The GGSN with SBCC is in an IP/Domain name based configuration and access point name (APN) configuration. Alternatively, a single WAP gateway is provided with the capability to determine pre-paid and post-paid subscribers according to the source IP address.

For post-paid subscribers, a WAP gateway (post-paid) IP address is deployed at the GGSN. Access is provided to the internet domain and GPRS free domain directly through the GGSN and to the internet domain and GPRS free domain through the WAP gateway. The GGSN further comprises a service based content charge (SBCC) module for recording GGSN call detail records.

For the content based charging solution for post-paid subscribers, the GGSN call detail record (G-CDR) comprises internet domain traffic by volume through the gateway GPRS Support Node (GGSN) to the internet domain, plus traffic by volume to the wireless application protocol (WAP) gateway, plus general packet radio service (GPRS) free domain traffic by volume through GGSN. The WAP-CDR comprises internet domain traffic by volume through the WAP gateway plus GPRS free domain traffic by volume through the WAP gateway. These two CDR's are provided to a mediation gateway (MD) and then filtered to remove the charge for GPRS free domain traffic by volume through the WAP gateway. The MD provides the filtered CDR to the billing system and the content data to the data warehouse (DW). Therefore, the post-paid subscriber is billed for internet domain traffic by volume through gateway GPRS Support Nodes (GGSN) to the internet domain, plus internet domain traffic by volume through the WAP gateway, plus GPRS free domain traffic by volume directly through the GGSN. The DW utilizes the content data to create analysis reports. A URL white list comprising a listing of accessible GPRS free domain content is located at the MD. The service platform (SP) or provising system is provided on the GPRS free domain and communicates appropriate URL white list information to the MD.

For pre-paid subscribers, a WAP gateway (pre-paid) IP address is deployed at the GGSN. For the content based charging solution for pre-paid subscribers, the G-CDR comprises traffic by volume through GGSN to the WAP gateway. The WAP-CDR comprises GPRS free domain traffic by volume through the WAP gateway. These CDR's are provided to the MD and then filtered for pre-paid users. The MD provides the content data to the DW.

For pre-paid subscribers, the internet domain is not available directly through the GGSN or the WAP gateway. Additionally, access to GPRS free domain traffic is only available through the WAP gateway and not directly through the GGSN. The URL white list comprising a listing of accessible GPRS free domain content for pre-paid subscribers is provided on the WAP gateway.

In order to block access to the internet domain for pre-paid subscribers, users are given a dedicated access point name (APN) to access the GGSN. A WAP gateway (pre-paid) IP address is deployed at the GGSN and access to the internet domain is barred by firewall and IP segment. The WAP gateway comprises a URL white list containing a list of available or accessible content or sites on the free GPRS domain. If the URL is not on the URL white list, access is barred. The service platform (SP) is provided on the GPRS free domain and communicates appropriate URL white list information to the WAP gateway.

For HTML browsing from a handset for post-paid subscribers, a WAP gateway (post-paid) IP address is deployed at the GGSN. The SP provides a message telling the user that a packet fee will be charged for HTML content. After which, access to the internet domain or GPRS free domain is provided.

For HTML browsing from a handset for pre-paid subscribers, a WAP gateway (pre-paid) IP address is deployed at the GGSN. Access to the internet domain, whether through the WAP gateway or directly through the GGSN is barred. Additionally, direct access to the GPRS free domain through the GGSN is barred and an error message is given indicating destination could not be reached or access to HTML content is denied. If the URL is in the URL white list located on the pre-paid WAP gateway, access to the GPRS free domain is given to pre-paid users. If the URL is not on the URL white list, access is barred.

Alternatively, the present invention comprises: a GGSN with SBCC patch and a URL white list; a WAP gateway with a URL white list for pre-paid subscribers; a URL white list on the SSBC and pre-paid WAP gateway; and a MD comprising a G-CDR and Service Class.

A separate WAP gateway is provided for post-paid and pre-paid subscribers in a URL based configuration. The GGSN with SBCC is in an IP/URL based configuration and access point name (APN) configuration.

For post-paid subscribers, a WAP gateway (post-paid) IP address and a URL white list are deployed at the GGSN. Access is provided to the internet domain and GPRS free domain directly through the GGSN and to the internet domain and GPRS free domain through the WAP gateway. A URL white list is located on the GGSN. The GGSN also comprises a SBCC for recording the G-CDR. For the content based charging solution for post-paid subscribers, the GGSN call detail record (G-CDR) comprises internet domain traffic by volume through gateway GPRS Support Nodes (GGSN) to the internet domain, plus traffic by volume to the internet domain through the wireless application protocol (WAP) gateway, plus general packet radio service (GPRS) free domain traffic by volume directly through GGSN, plus GPRS free domain traffic by volume through the WAP gateway. The G-CDR is provided to the MD and then filtered to remove charges for GPRS free domain traffic by volume directly through GGSN and GPRS free domain traffic by volume through the WAP gateway.

The MD provides the filtered CDR to the billing system and the content data to the data warehouse (DW). Therefore, the post-paid subscriber is billed for internet domain traffic by volume through gateway GPRS Support Nodes (GGSN) to the internet domain, plus internet domain traffic by volume through the post-paid WAP gateway. The DW utilizes the content data to create analysis reports.

A URL white list comprising a listing of accessible GPRS free domain content is located at the GGSN. The service platform (SP) is provided on the GPRS free domain and communicates appropriate URL white list information to the GGSN.

For pre-paid subscribers, a WAP gateway (pre-paid) IP address is deployed at the GGSN. For the content based charging solution for pre-paid subscribers, the G-CDR comprises traffic by volume through the GGSN to the GPRS free domain through the pre-paid WAP gateway and traffic by volume to the GPRS free domain directly through the GGSN. The G-CDR is provided to the MD and filtered for pre-paid users. The MD provides the content data to the data warehouse (DW). The DW utilizes the content data to create analysis reports. With this solution, the internet domain is not available whether through GGSN or WAP gateways. A URL white list comprising a listing of accessible GPRS free domain content is located at the GGSN.

In order to block access to the internet domain for pre-paid subscribers, users are given a dedicated access point name (APN) to access the GGSN. A WAP gateway (pre-paid) IP address is deployed at the GGSN and access to the internet domain is barred by firewall and IP segment. A URL white list containing a list of available or accessible content or sites on the free GPRS domain is located at the WAP gateway. If the URL is not on the URL white list, access is barred. The service platform (SP) is provided on the GPRS free domain and communicates appropriate URL white list information to the WAP gateway. Therefore, pre-paid subscribers are barred access to the internet domain either through the GGSN or WAP gateway but have access to the GPRS free domain either through the GGSN or WAP gateway, provided that the site or content is on the URL white list.

For HTML browsing from a handset for post-paid subscribers, a WAP gateway (post-paid) IP address is deployed at the GGSN. The SP provides a message telling the user that a packet fee will be charged for HTML content. After which, access to the internet domain or GPRS free domain is provided.

For HTML browsing from a handset for pre-paid subscribers, a WAP gateway (pre-paid) IP address is deployed at the GGSN. Access to the internet domain, whether through the WAP gateway or directly through the GGSN is barred. If the URL is on the URL white list located on the pre-paid WAP gateway, access to the GPRS free domain is given to pre-paid users. If the URL is not on the URL white list, access is barred.

Alternatively, the present invention comprises: a GGSN with SBCC and URL domain name filtering; a WAP gateway without a URL white list feature but with a domain name white list; a domain name white list on the WAP gateway and a URL white list on the MD; and a MD comprising a G-CDR and WAP-CDR.

A separate WAP gateway is provided for post-paid and pre-paid subscribers in a domain name based configuration. The GGSN with SBCC is in an IP/Domain name based configuration and access point name (APN) configuration.

For post-paid subscribers, a WAP gateway (post-paid) IP address is deployed at the GGSN. Access is provided to the internet domain and GPRS free domain directly through the GGSN and to the internet domain and GPRS free domain through the WAP gateway. The GGSN further comprises a service based content charge (SBCC) module for recording GGSN call detail records.

For the content based charging solution for post-paid subscribers, the GGSN call detail record (G-CDR) comprises internet domain traffic by volume through the gateway GPRS Support Node (GGSN) to the internet domain, plus traffic by volume to the wireless application protocol (WAP) gateway, plus general packet radio service (GPRS) free domain traffic by volume through GGSN. The WAP-CDR comprises internet domain traffic by volume through the WAP gateway plus GPRS free domain traffic by volume through the WAP gateway. These two CDR's are provided to a mediation gateway (MD) and then filtered to remove the charge for GPRS free domain traffic by volume through the WAP gateway. The MD provides the filtered CDR to the billing system and the content data to the data warehouse (DW). Therefore, the post-paid subscriber is billed for internet domain traffic by volume through gateway GPRS Support Nodes (GGSN) to the internet domain, plus internet domain traffic by volume through the WAP gateway, plus GPRS free domain traffic by volume directly through the GGSN. The DW utilizes the content data to create analysis reports.

A URL white list comprising a listing of accessible GPRS free domain content is located at the MD. The service platform (SP) is provided on the GPRS free domain and communicates appropriate URL white list information to the MD.

For pre-paid subscribers, a WAP gateway (pre-paid) IP address is deployed at the GGSN. For the content based charging solution for pre-paid subscribers, the G-CDR comprises traffic by volume through GGSN to the WAP gateway. The WAP-CDR comprises GPRS free domain traffic by volume through the WAP gateway. These CDR's are provided to the MD and then filtered to remove the traffic by volume through the GGSN to the WAP gateway. The MD provides the content data to the DW. For pre-paid subscribers, the internet domain is not available directly through the GGSN. Additionally, access to GPRS free domain traffic is only available through the WAP gateway and not directly through the GGSN. The domain name white list comprising a listing of accessible GPRS free domain content for pre-paid subscribers is provided on the WAP gateway. However, not all traffic through the WAP gateway to the internet domain can be prevented and only the domain name white list can be controlled. As a result, the MD provides any charges from the WAP-CDR for this traffic to the billing system and the user is post-charged.

In order to block access to the internet domain for pre-paid subscribers, users are given a dedicated access point name (APN) to access the GGSN. A WAP gateway (pre-paid) IP address is deployed at the GGSN and access to the internet domain is barred by firewall and IP segment. The WAP gateway is a dedicated WAP gateway for pre-paid users and comprises a domain name white list containing a list of available or accessible content or sites on the free GPRS domain. If the domain name is not on the domain name white list, access is barred. The service platform (SP) is provided on the GPRS free domain and communicates appropriate domain name white list information to the WAP gateway. As described above, not all traffic through the WAP gateway to the internet domain can be prevented and only the domain name white list can be controlled. Access is controlled by the domain name white list configuration.

For HTML browsing from a handset for post-paid subscribers, a WAP gateway (post-paid) IP address is deployed at the GGSN. The SP provides a message telling the user that a packet fee will be charged for HTML content. After which, access to the internet domain or GPRS free domain is provided.

For HTML browsing from a handset for post-paid subscribers, a WAP gateway (pre-paid) IP address is deployed at the GGSN. Access to the internet domain, whether through the WAP gateway or directly through the GGSN is barred. Additionally, direct access to the GPRS free domain through the GGSN is barred and an error message is given indicating destination could not be reached or access to HTML content is denied. If the domain name is on the domain name white list located on the pre-paid WAP gateway, access to the GPRS free domain is given to pre-paid users. If the domain name is not on the domain name white list, access is barred. Since all traffic through the WAP gateway to the internet domain can not be prevented, this traffic from the WAP-CDR will be post-charged to the user.

Alternatively, the present invention comprises: a GGSN with SBCC and WAP gateway IP and URL domain name filtering; a WAP gateway without a URL white list feature but with a domain name white list; a URL white list on the MD; a layer 4 switch with URL white list configuration for the dedicated pre-paid user WAP gateway; and a MD comprising a G-CDR and WAP-CDR.

A separate WAP gateway is provided for post-paid and pre-paid subscribers in a URL based configuration. The pre-paid WAP Gateway further comprises an L4 switch. The GGSN with SBCC is in an IP/Domain name based configuration and access point name (APN) configuration.

For post-paid subscribers, a WAP gateway (post-paid) IP address is deployed at the GGSN. Access is provided to the internet domain and GPRS free domain directly through the GGSN and to the internet domain and GPRS free domain through the WAP gateway. The GGSN further comprises a service based content charge (SBCC) module for recording GGSN call detail records.

For the content based charging solution for post-paid subscribers, the GGSN call detail record (G-CDR) comprises internet domain traffic by volume through the gateway GPRS Support Node (GGSN) to the internet domain, plus traffic by volume to the wireless application protocol (WAP) gateway, plus general packet radio service (GPRS) free domain traffic by volume through GGSN. The WAP-CDR comprises internet domain traffic by volume through the WAP gateway plus GPRS free domain traffic by volume through the WAP gateway. These two CDR's are provided to a mediation gateway (MD) and then filtered to remove the charge for GPRS free domain traffic by volume through the WAP gateway. The MD provides the filtered CDR to the billing system and the content data to the data warehouse (DW). Therefore, the post-paid subscriber is billed for internet domain traffic by volume through gateway GPRS Support Nodes (GGSN) to the internet domain, plus internet domain traffic by volume through the WAP gateway, plus GPRS free domain traffic by volume directly through the GGSN. The DW utilizes the content data to create analysis reports.

A URL white list comprising a listing of accessible GPRS free domain content is located at the MD. The service platform (SP) is provided on the GPRS free domain and communicates appropriate URL white list information to the MD.

For pre-paid subscribers, a WAP gateway (pre-paid) IP address is deployed at the GGSN. For the content based charging solution for pre-paid subscribers, the G-CDR comprises traffic by volume through GGSN to the WAP gateway. The WAP-CDR comprises GPRS free domain traffic by volume through the WAP gateway. These CDR's are provided to the MD and then filtered to remove the traffic by volume through the GGSN to the WAP gateway. The MD provides the content data to the DW. For pre-paid subscribers, the internet domain is not available directly through the GGSN.

Additionally, access to GPRS free domain traffic is only available through the WAP gateway and not directly through the GGSN. The domain name white list comprising a listing of accessible GPRS free domain content for pre-paid subscribers is provided on the WAP gateway. However, not all traffic through the WAP gateway to the internet domain can be prevented. Therefore, an L4 switch acting as a URL white list hub is provided between the WAP gateway and the internet domain. The L4 switch prevents inappropriate access through the WAP gateway to the internet domain.

In order to block access to the internet domain for pre-paid subscribers, users are given a dedicated access point name (APN) to access the GGSN. A WAP gateway (pre-paid) IP address is deployed at the GGSN and access to the internet domain is barred by firewall and IP segment. The WAP gateway is a dedicated WAP gateway for pre-paid users and comprises a domain name white list containing a list of available or accessible content or sites on the free GPRS domain. If the domain name is not on the domain name white list, access is barred. The service platform (SP) is provided on the GPRS free domain and communicates appropriate domain name white list information to the WAP gateway.

As described above, not all traffic through the WAP gateway to the internet domain can be prevented. Therefore, an L4 switch acting as a URL white list hub is provided between the WAP gateway and the internet domain. The L4 switch prevents inappropriate access through the WAP gateway to the internet domain. The SP provides appropriate URL white list information to the L4 switch.

For HTML browsing from a handset for post-paid subscribers, a WAP gateway (post-paid) IP address is deployed at the GGSN. The SP provides a message telling the user that a packet fee will be charged for HTML content. After which, access to the internet domain or GPRS free domain is provided.

For HTML browsing from a handset for post-paid subscribers, a WAP gateway (pre-paid) IP address is deployed at the GGSN. Access to the internet domain, whether through the WAP gateway or directly through the GGSN is barred. Additionally, direct access to the GPRS free domain through the GGSN is barred and an error message is given indicating destination could not be reached or access to HTML content is denied. If the domain name is on the domain name white list located on the pre-paid WAP gateway, access to the GPRS free domain is given to pre-paid users. If the domain name is not on the domain name white list, access is barred. Since all traffic through the WAP gateway to the internet domain can not be prevented, the L4 switch with URL white list is utilized to bar access to the internet domain.

Therefore, the present invention provides an accurate, effective, and efficient system for content based charging, access barring, and network browsing, for pre-paid and post-paid subscribers of a wireless mobile communication network system.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
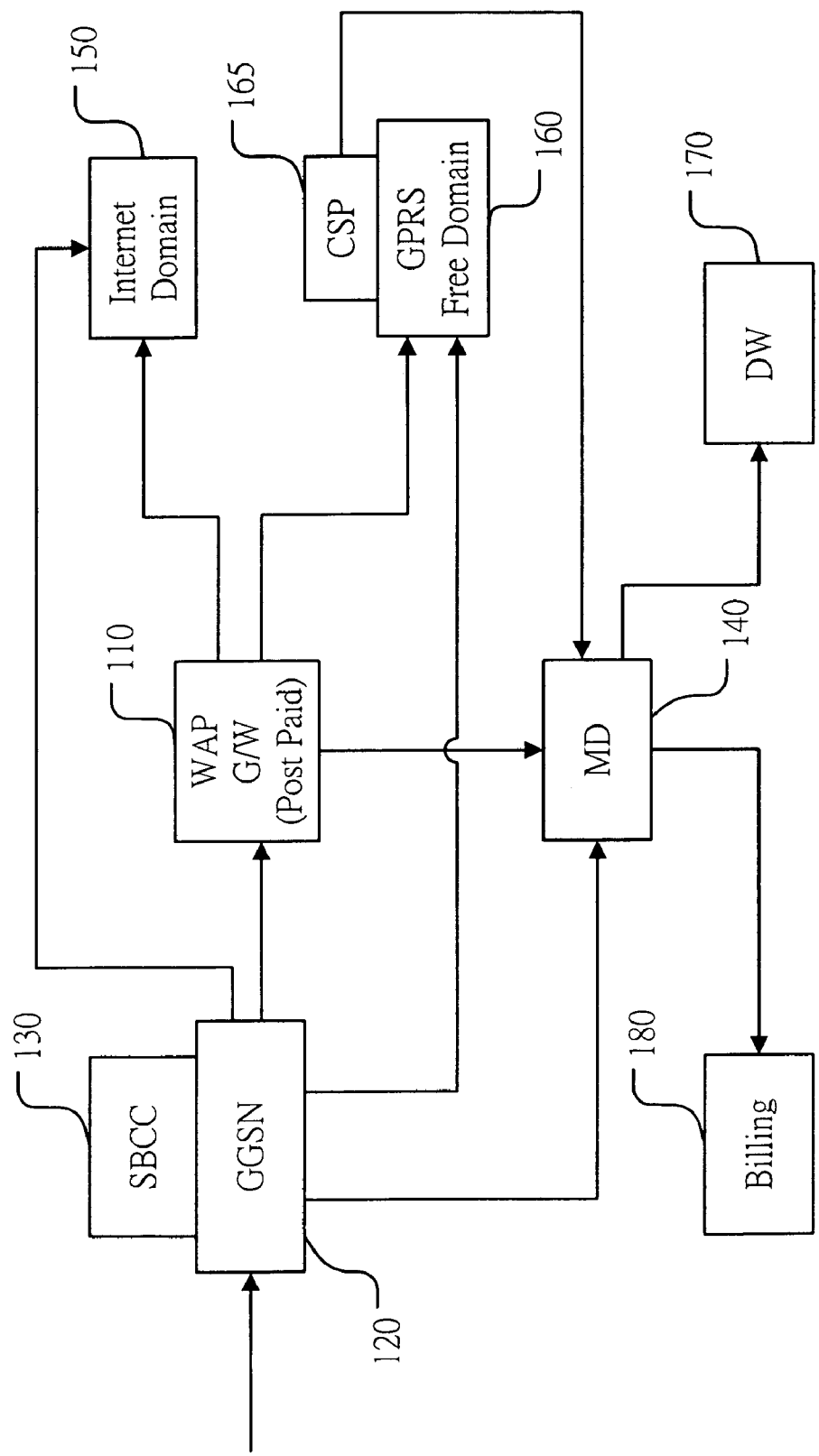
FIG. 1 is a block diagram illustrating a method for content charging for post-paid subscribers according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1, which is a block diagram illustrating a method for content charging according to an embodiment of the present invention.

A WAP gateway (post-paid) IP address is deployed at the GGSN 120. Access is provided to the internet domain 150 and GPRS free domain 160 directly through the GGSN 120 and to the internet domain 150 and GPRS free domain 160 through the WAP gateway 110. The GGSN 120 further comprises a service based content charge (SBCC) module 130 for recording GGSN call detail records.

For the content based charging solution for post-paid subscribers, the GGSN call detail record (G-CDR) comprises internet domain traffic by volume through the gateway GPRS Support Node (GGSN) 120 to the internet domain 150, plus traffic by volume to the wireless application protocol (WAP) gateway 110, plus general packet radio service (GPRS) free domain 160 traffic by volume through GGSN 120.

The WAP-CDR comprises internet domain traffic by volume through the WAP gateway 110 plus GPRS free domain 160 traffic by volume through the WAP gateway 110.

These two CDR's are provided to a mediation gateway (MD) 140 and then filtered to remove the charge for GPRS free domain 160 traffic by volume through the WAP gateway 110. The MD 140 provides the filtered CDR to the billing system 180 and the content data to the data warehouse (DW) 170. Therefore, the post-paid subscriber is billed for internet domain traffic by volume through gateway GPRS Support Nodes (GGSN) 120 to the internet domain 150, plus internet domain traffic by volume through the WAP gateway 110, plus GPRS free domain traffic by volume directly through the GGSN 120. The DW 170 utilizes the content data to create analysis reports.

In this embodiment of the present invention, a URL white list comprising a listing of accessible GPRS free domain content is located at the MD 140. The service platform (SP) 165 is provided on the GPRS free domain 160 and communicates appropriate URL white list information to the MD 140.

Figure 2:
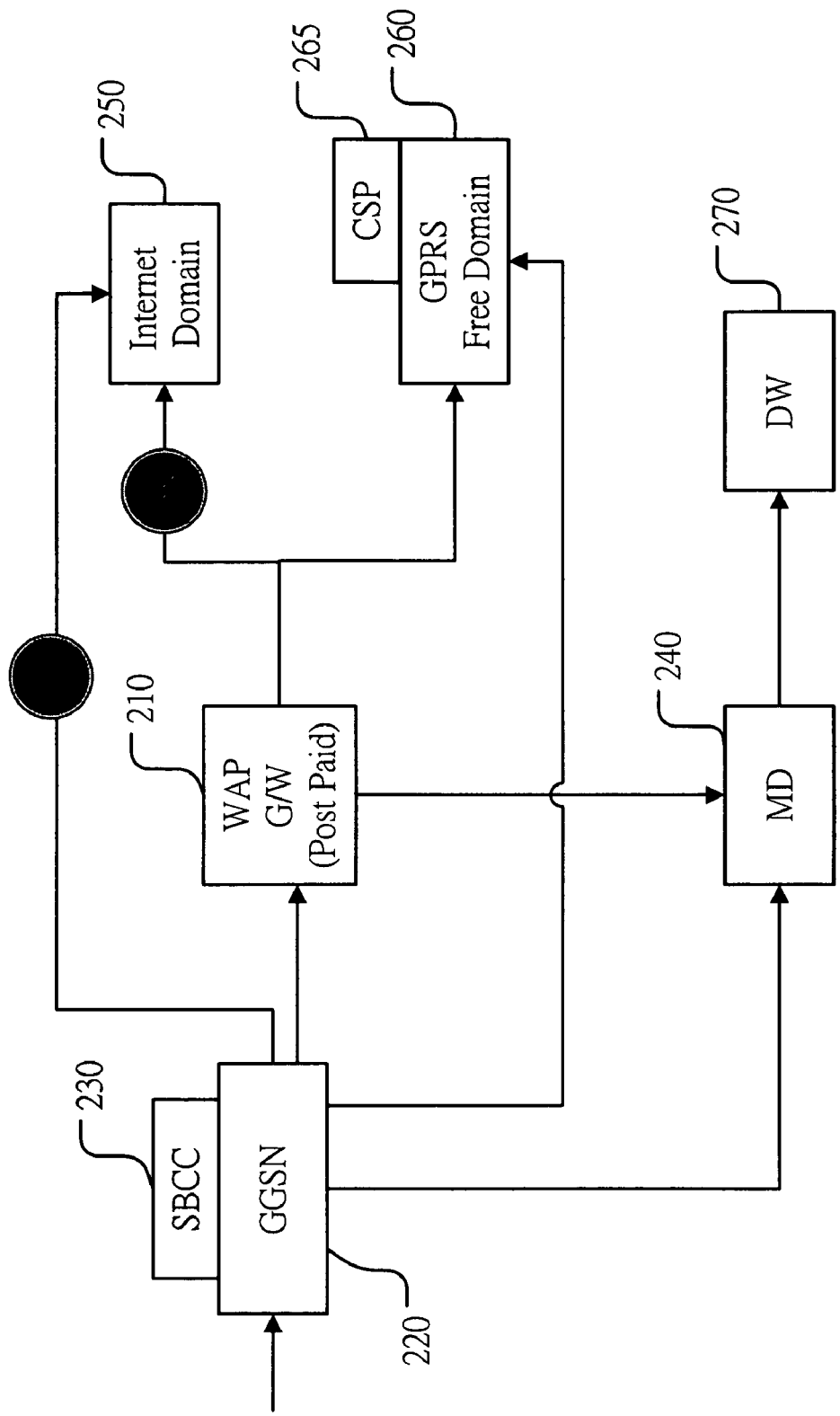
FIG. 2 is a block diagram illustrating a method for content charging for pre-paid subscribers according to an embodiment of the present invention.

Refer to FIG. 2, which is a block diagram illustrating a method for content charging for pre-paid subscribers according to an embodiment of the present invention.

A WAP gateway (pre-paid) IP address is deployed at the GGSN 220. For the content based charging solution for pre-paid subscribers, the G-CDR comprises traffic by volume through GGSN 220 to the WAP gateway 210. The WAP-CDR comprises GPRS free domain traffic by volume through the WAP gateway 210. These CDR's are provided to the MD 240 and then filtered for pre-paid users. The MD 240 provides the content data to the DW 270.

For pre-paid subscribers, the internet domain 250 is not available directly through the GGSN 220 or the WAP gateway 210. Additionally, access to GPRS free domain 260 traffic is only available through the WAP gateway 210 and not directly through the GGSN 220. The URL white list comprising a listing of accessible GPRS free domain content for pre-paid subscribers is provided on the WAP gateway 210.

Figure 3:
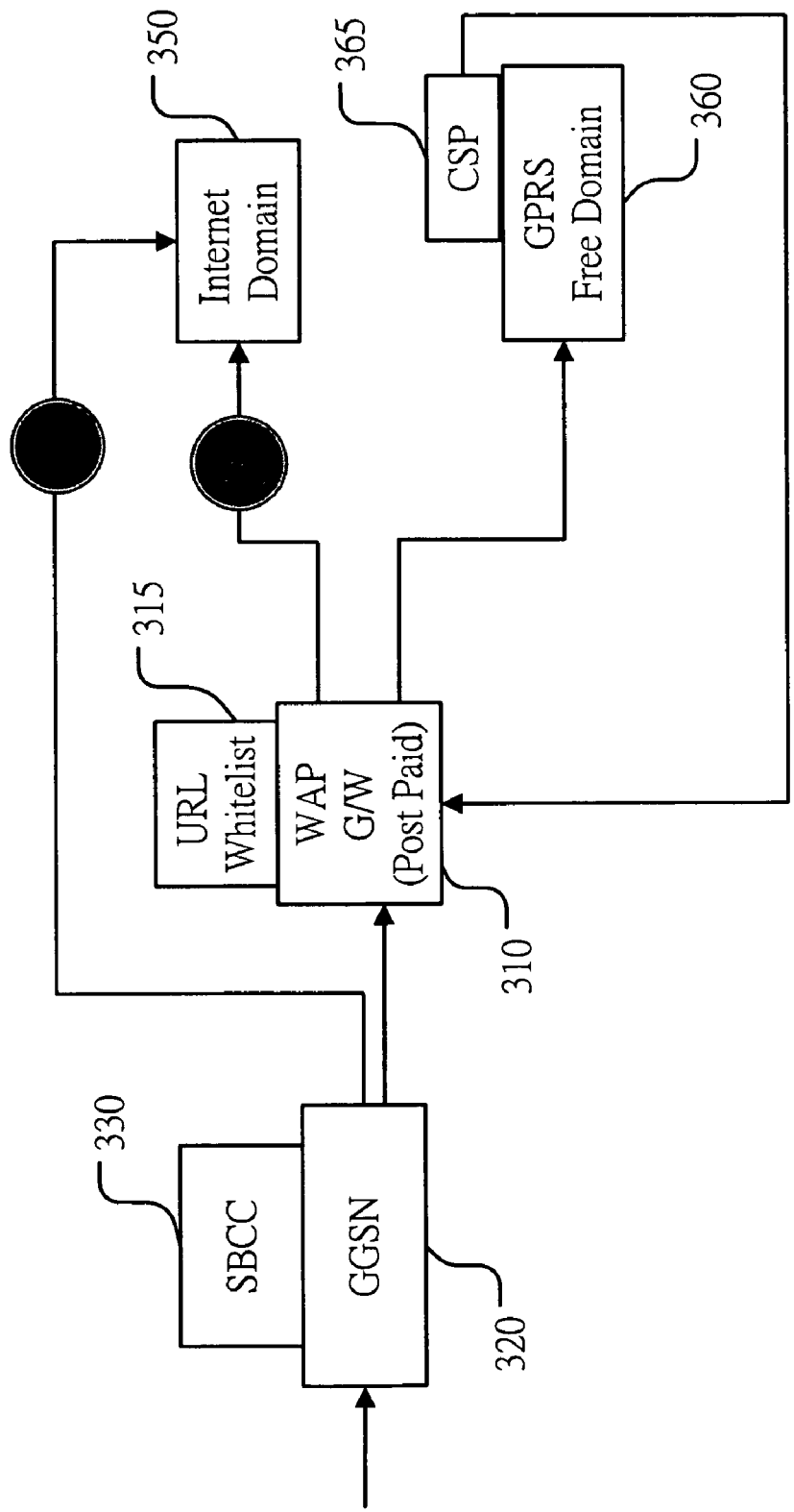
FIG. 3 is a block diagram illustrating access barring for pre-paid subscribers according to an embodiment of the present invention.

Refer to FIG. 3, which is a block diagram illustrating access barring for pre-paid subscribers according to an embodiment of the present invention.

In order to block access to the internet domain 350 for pre-paid subscribers, users are given a dedicated access point name (APN) to access the GGSN 320. A WAP gateway (pre-paid) IP address is deployed at the GGSN 320 and access to the internet domain 350 is barred by firewall and IP segment. The WAP gateway 310 is a dedicated WAP gateway for pre-paid users and comprises a URL white list containing a list of available or accessible content or sites on the free GPRS domain 360. If the URL is not on the URL white list, access is barred. The service platform (SP) 365 is provided on the GPRS free domain 360 and communicates appropriate URL white list information to the WAP gateway 310.

Figure 4:
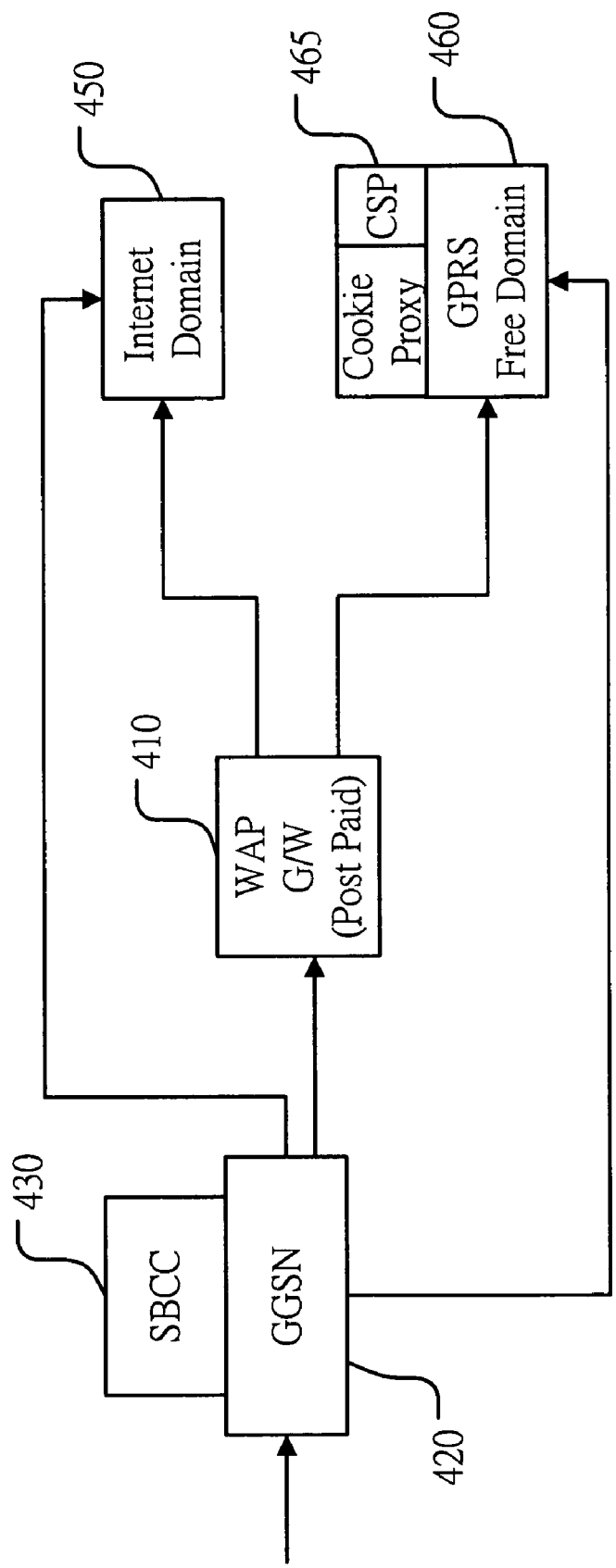
FIG. 4 is a block diagram illustrating HTML browsing from a handset for post-paid subscribers according to an embodiment of the present invention.

Refer to FIG. 4, which is a block diagram illustrating HTML browsing from a handset for post-paid subscribers according to an embodiment of the present invention.

A WAP gateway (post-paid) IP address is deployed at the GGSN 420. The SP 465 provides a message telling the user that a packet fee will be charged for HTML content. After which, access to the internet domain 450 or GPRS free domain 460 is provided.

Figure 5:
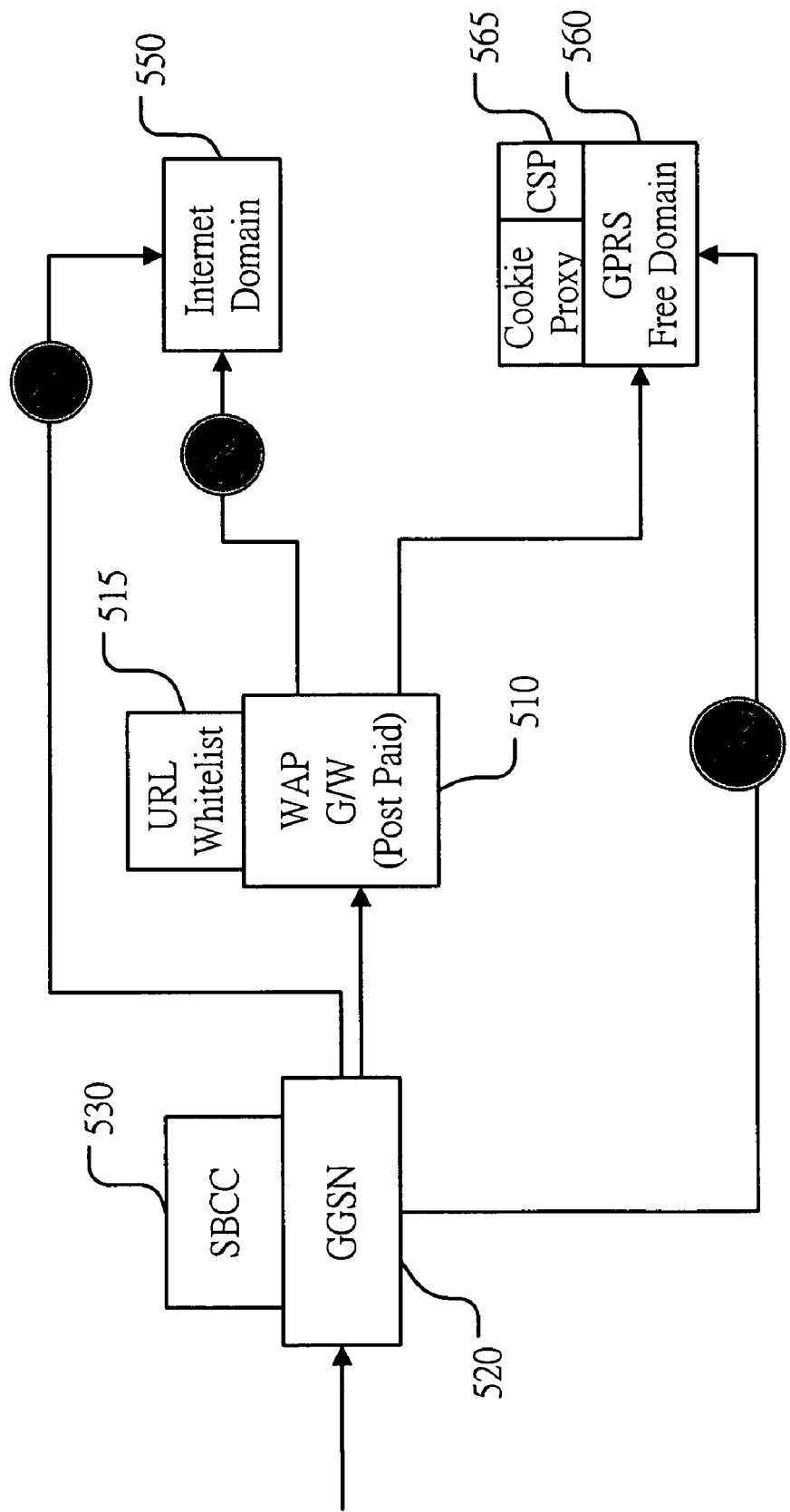
FIG. 5 is a block diagram illustrating HTML browsing from a handset for pre-paid subscribers according to an embodiment of the present invention.

Refer to FIG. 5, which is a block diagram illustrating HTML browsing from a handset for pre-paid subscribers according to an embodiment of the present invention.

A WAP gateway (pre-paid) IP address is deployed at the GGSN 520. Access to the internet domain 550, whether through the WAP gateway 510 or directly through the GGSN 520 is barred. Additionally, direct access to the GPRS free domain 560 through the GGSN 520 is barred and an error message is given indicating destination could not be reached or access to HTML content is denied.

If the URL is in the URL white list located on the pre-paid WAP gateway 510, access to the GPRS free domain 560 is given to pre-paid users. If the URL is not on the URL white list, access is barred.

Therefore, in an embodiment of the present invention as illustrated in FIGS. 1, 2, 3, 4, and 5, the present invention comprises: a GGSN with SBCC and WAP gateway IP filtering; a WAP gateway with a URL white list for pre-paid subscribers; a URL white list on the MD and WAP gateway; and a MD comprising a G-CDR, a WAP-CDR, Service Class, and a URL white list.

Figure 6:
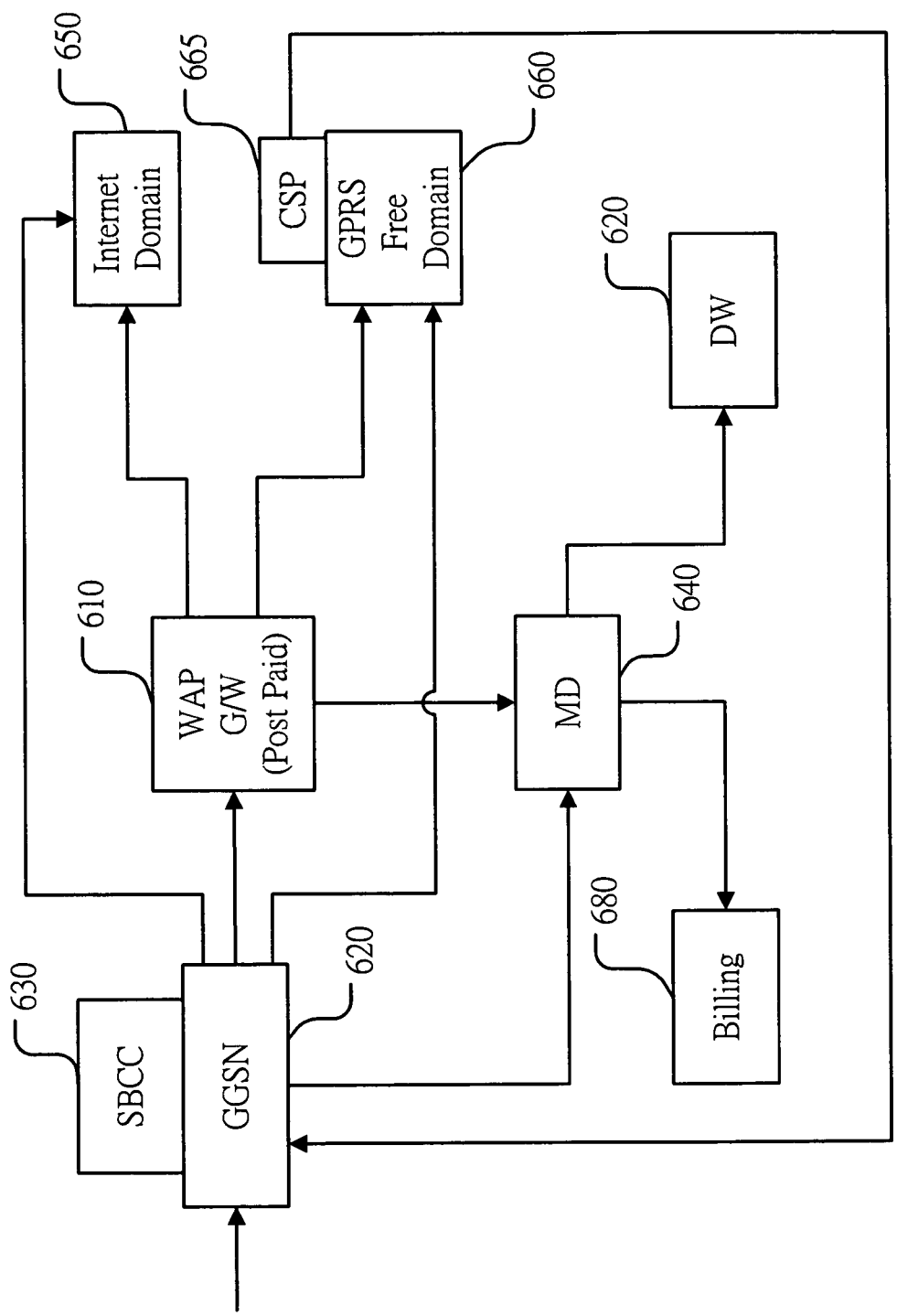
FIG. 6 is a block diagram illustrating a method for content charging for post-paid subscribers according to an embodiment of the present invention.

Refer to FIG. 6, which is a block diagram illustrating a method for content charging for post-paid subscribers according to an embodiment of the present invention.

A WAP gateway (post-paid) IP address and a URL white list are deployed at the GGSN 620. Access is provided to the internet domain 650 and GPRS free domain 660 directly through the GGSN 620 and to the internet domain 650 and GPRS free domain 650 through the WAP gateway 610. In this embodiment a URL white list is located on the GGSN 620. The GGSN 620 also comprises a SBCC 630 for recording the G-CDR.

For the content based charging solution for post-paid subscribers, the GGSN call detail record (G-CDR) comprises internet domain traffic by volume through gateway GPRS Support Nodes (GGSN) 620 to the internet domain 650, plus traffic by volume to the internet domain through the wireless application protocol (WAP) gateway 610, plus general packet radio service (GPRS) free domain traffic by volume directly through GGSN 620, plus GPRS free domain traffic by volume through the WAP gateway 610.

The G-CDR is provided to the MD 640 and then filtered to remove charges for GPRS free domain traffic by volume directly through GGSN 620 and GPRS free domain traffic by volume through the WAP gateway 610.

The MD 640 provides the filtered CDR to the billing system 680 and the content data to the data warehouse (DW) 670. Therefore, the post-paid subscriber is billed for internet domain traffic by volume through gateway GPRS Support Nodes (GGSN) 620 to the internet domain 650, plus internet domain traffic by volume through the post-paid WAP gateway 610. The DW 670 utilizes the content data to create analysis reports.

In this embodiment of the present invention, a URL white list comprising a listing of accessible GPRS free domain content is located at the GGSN 620. The service platform (SP) 665 is provided on the GPRS free domain 660 and communicates appropriate URL white list information to the GGSN 620.

Figure 7:
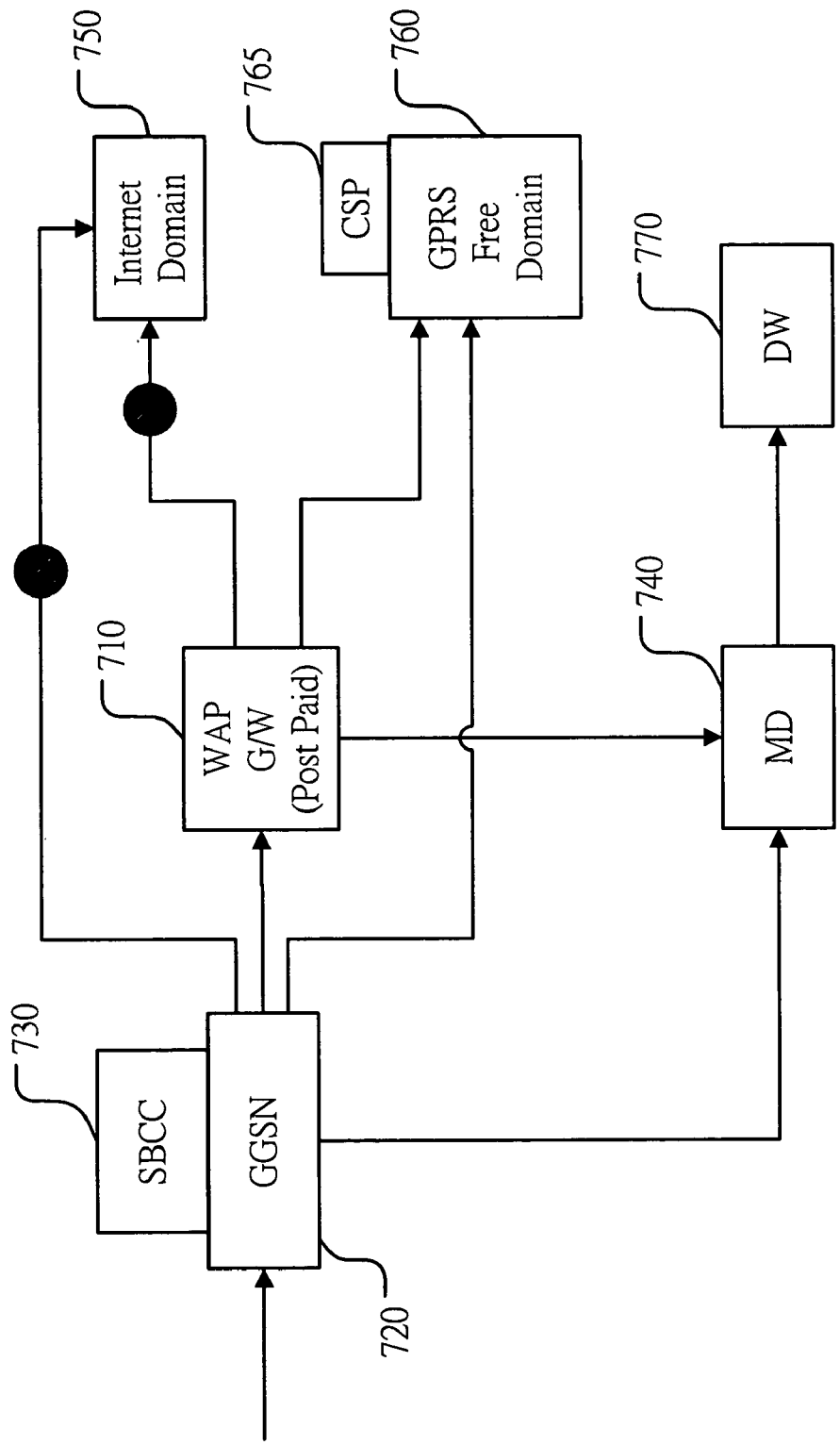
FIG. 7 is a block diagram illustrating content based charging solution for pre-paid subscribers according to an embodiment of the present invention.

Refer to FIG. 7, which is a block diagram illustrating a content based charging solution for pre-paid subscribers according to an embodiment of the present invention.

A WAP gateway (pre-paid) IP address is deployed at the GGSN 720. For the content based charging solution for pre-paid subscribers, the G-CDR comprises traffic by volume through the GGSN 720 to the GPRS free domain 760 through the pre-paid WAP gateway 710 and traffic by volume to the GPRS free domain 760 directly through the GGSN 720.

The G-CDR is provided to the MD 740 and filtered for pre-paid users. The MD 740 provides the content data to the data warehouse (DW) 770. The DW 770 utilizes the content data to create analysis reports.

With this solution, the internet domain is not available whether through GGSN 720 or WAP gateways 710. In this embodiment of the present invention, a URL white list comprising a listing of accessible GPRS free domain content is located at the GGSN 720.

Figure 8:
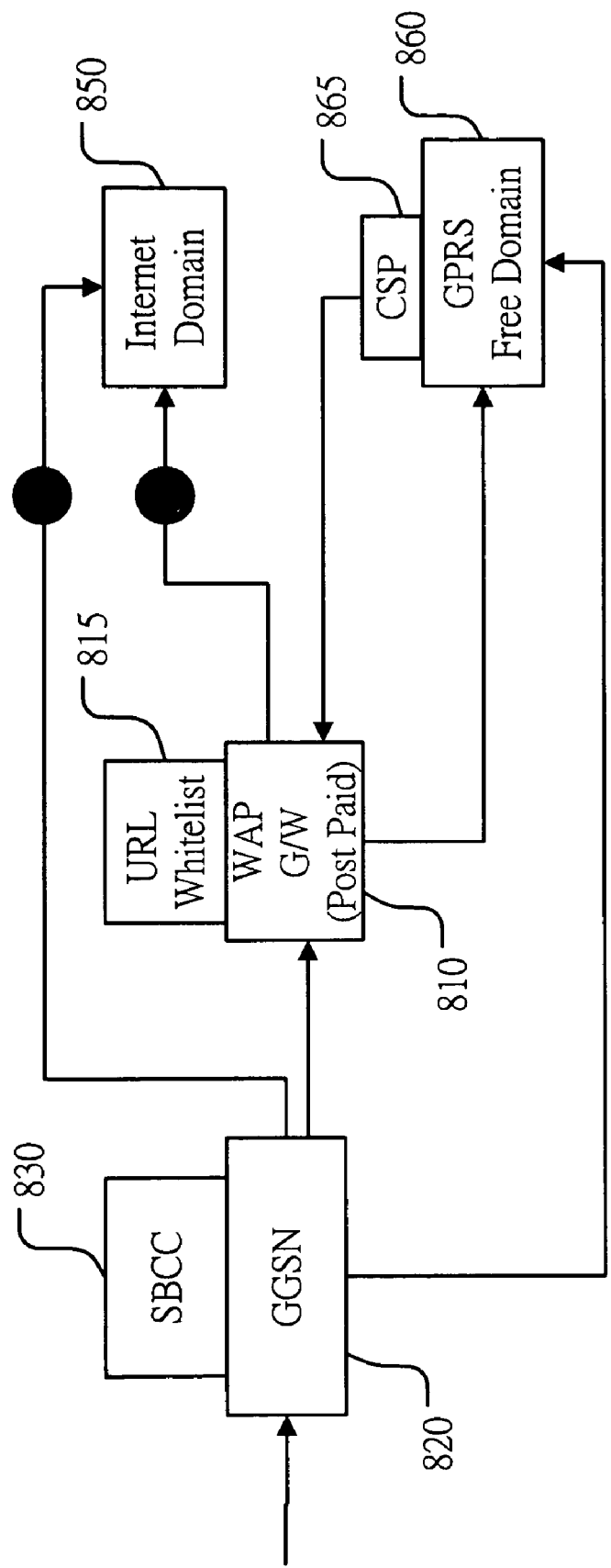
FIG. 8 is a block diagram illustrating access barring for pre-paid subscribers according to an embodiment of the present invention.

Refer to FIG. 8, which is a block diagram illustrating access barring for pre-paid subscribers according to an embodiment of the present invention.

In order to block access to the internet domain for pre-paid subscribers, users are given a dedicated access point name (APN) to access the GGSN 820. A WAP gateway (pre-paid) IP address is deployed at the GGSN 820 and access to the internet domain 850 is barred by firewall and IP segment. A URL white list containing a list of available or accessible content or sites on the free GPRS domain 860 is located at the WAP gateway 810. If the URL is not on the URL white list, access is barred. The service platform (SP) 865 is provided on the GPRS free domain 860 and communicates appropriate URL white list information to the WAP gateway 810. The WAP gateway 810 is a dedicated WAP gateway for pre-paid users. Alternatively, a single WAP gateway is provided with the capability to determine pre-paid and post-paid subscribers according to the source IP address. Therefore, in this embodiment of the present invention, pre-paid subscribers are barred access to the internet domain 850 either through the GGSN 820 or WAP gateway 810 but have access to the GPRS free domain 860 either through the GGSN 820 or WAP gateway 810, provided that the site or content is on the URL white list.

Figure 9:
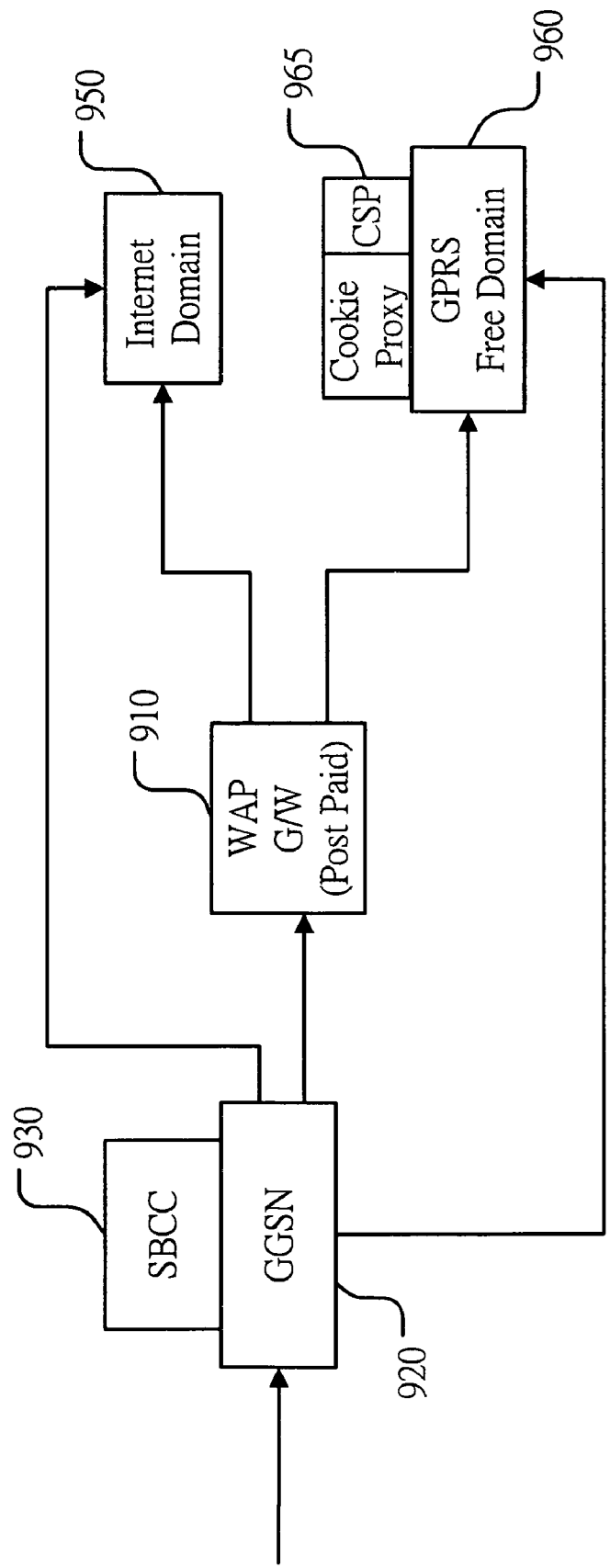
FIG. 9 is a block diagram illustrating HTML browsing from a handset for post-paid subscribers according to an embodiment of the present invention.

Refer to FIG. 9, which is a block diagram illustrating HTML browsing from a handset for post-paid subscribers according to an embodiment of the present invention.

A WAP gateway (post-paid) IP address is deployed at the GGSN 920. The SP 965 provides a message telling the user that a packet fee will be charged for HTML content. After which, access to the internet domain 950 or GPRS free domain 960 is provided.

Figure 10:
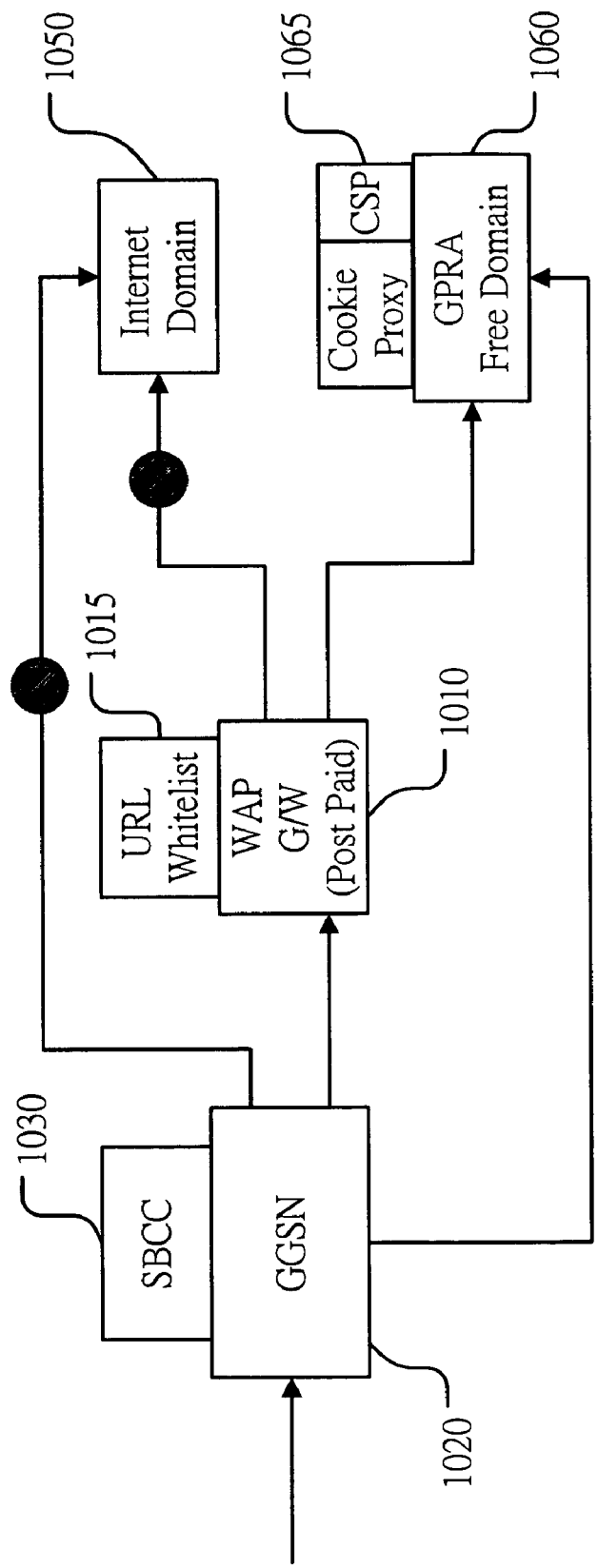
FIG. 10 is a block diagram illustrating HTML browsing from a handset for pre-paid subscribers according to an embodiment of the present invention.

Refer to FIG. 10, which is a block diagram illustrating HTML browsing from a handset for pre-paid subscribers according to an embodiment of the present invention.

A WAP gateway (pre-paid) IP address is deployed at the GGSN 1020. Access to the internet domain 1050, whether through the WAP gateway 1010 or directly through the GGSN 1020 is barred.

If the URL is on the URL white list located on the pre-paid WAP gateway 1010, access to the GPRS free domain 1060 is given to pre-paid users. If the URL is not on the URL white list, access is barred.

Therefore, in an embodiment of the present invention as illustrated in FIGS. 6, 7, 8, 9, and 10, the present invention comprises: a GGSN with SBCC patch and a URL white list; a WAP gateway with a URL white list for pre-paid subscribers; a URL white list on the SSBC and pre-paid WAP gateway; and a MD comprising a G-CDR and Service Class.

Figure 11:
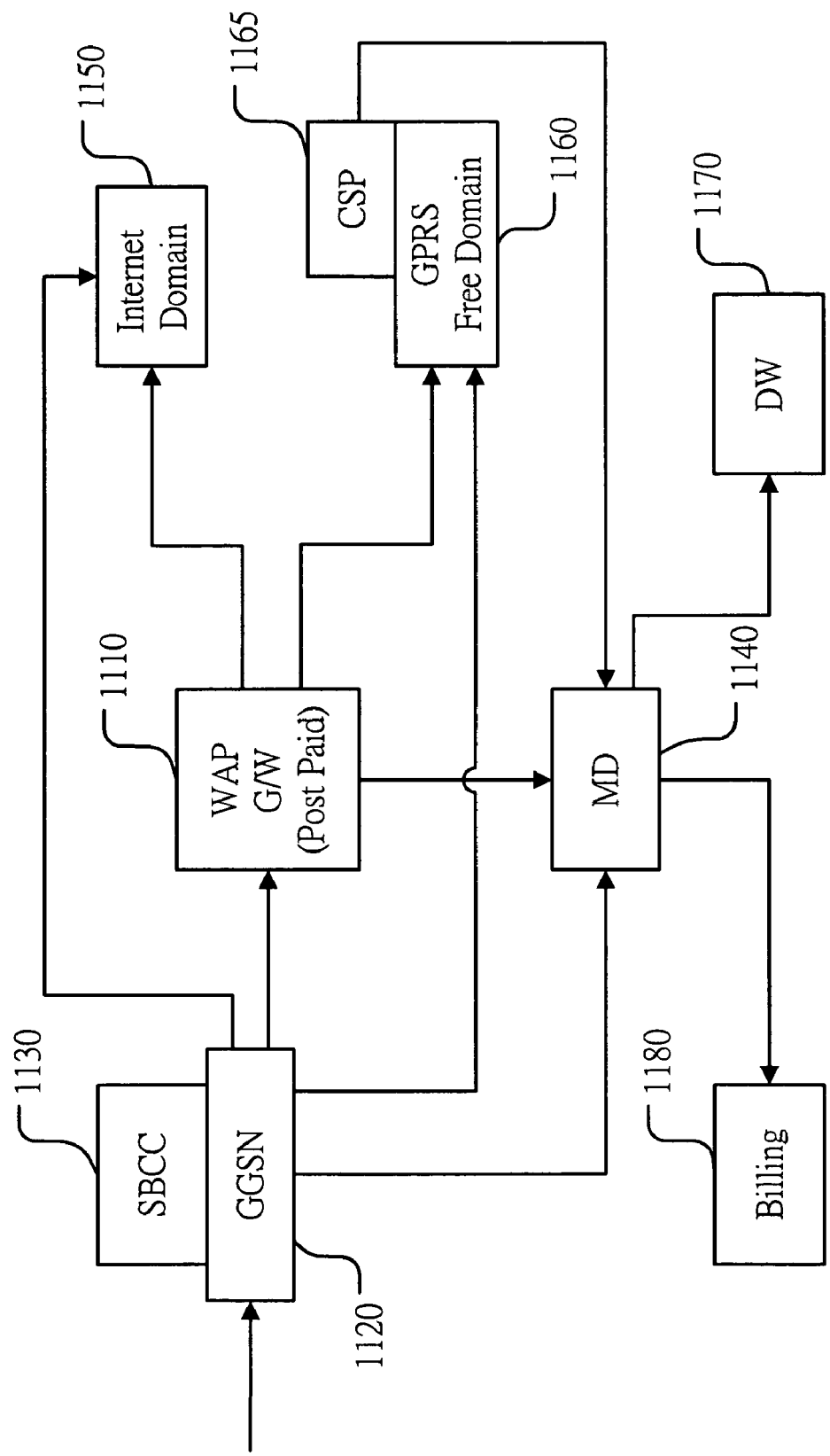
FIG. 11 is a block diagram illustrating a method for content charging according to an embodiment of the present invention.

Refer to FIG. 11, which is a block diagram illustrating a method for content charging according to an embodiment of the present invention.

A WAP gateway (post-paid) IP address is deployed at the GGSN 1120. Access is provided to the internet domain 1150 and GPRS free domain 1160 directly through the GGSN 1120 and to the internet domain 1150 and GPRS free domain 1160 through the WAP gateway 1110. The GGSN 1120 further comprises a service based content charge (SBCC) module 1130 for recording GGSN call detail records.

For the content based charging solution for post-paid subscribers, the GGSN call detail record (G-CDR) comprises internet domain traffic by volume through the gateway GPRS Support Node (GGSN) 1120 to the internet domain 1150, plus traffic by volume to the wireless application protocol (WAP) gateway 1110, plus general packet radio service (GPRS) free domain traffic by volume through GGSN 1120.

The WAP-CDR comprises internet domain traffic by volume through the WAP gateway 1110 plus GPRS free domain traffic by volume through the WAP gateway 1110.

These two CDR's are provided to a mediation gateway (MD) 1140 and then filtered to remove the charge for GPRS free domain traffic by volume through the WAP gateway 1110. The MD 1140 provides the filtered CDR to the billing system 1180 and the content data to the data warehouse (DW) 1170. Therefore, the post-paid subscriber is billed for internet domain traffic by volume through gateway GPRS Support Nodes (GGSN) 1120 to the internet domain 1150, plus internet domain traffic by volume through the WAP gateway 1110, plus GPRS free domain traffic by volume directly through the GGSN 1120. The DW 1170 utilizes the content data to create analysis reports.

In this embodiment of the present invention, a URL white list comprising a listing of accessible GPRS free domain content is located at the MD 1140. The service platform (SP) 1165 is provided on the GPRS free domain 1160 and communicates appropriate URL white list information to the MD 1140.

Figure 12:
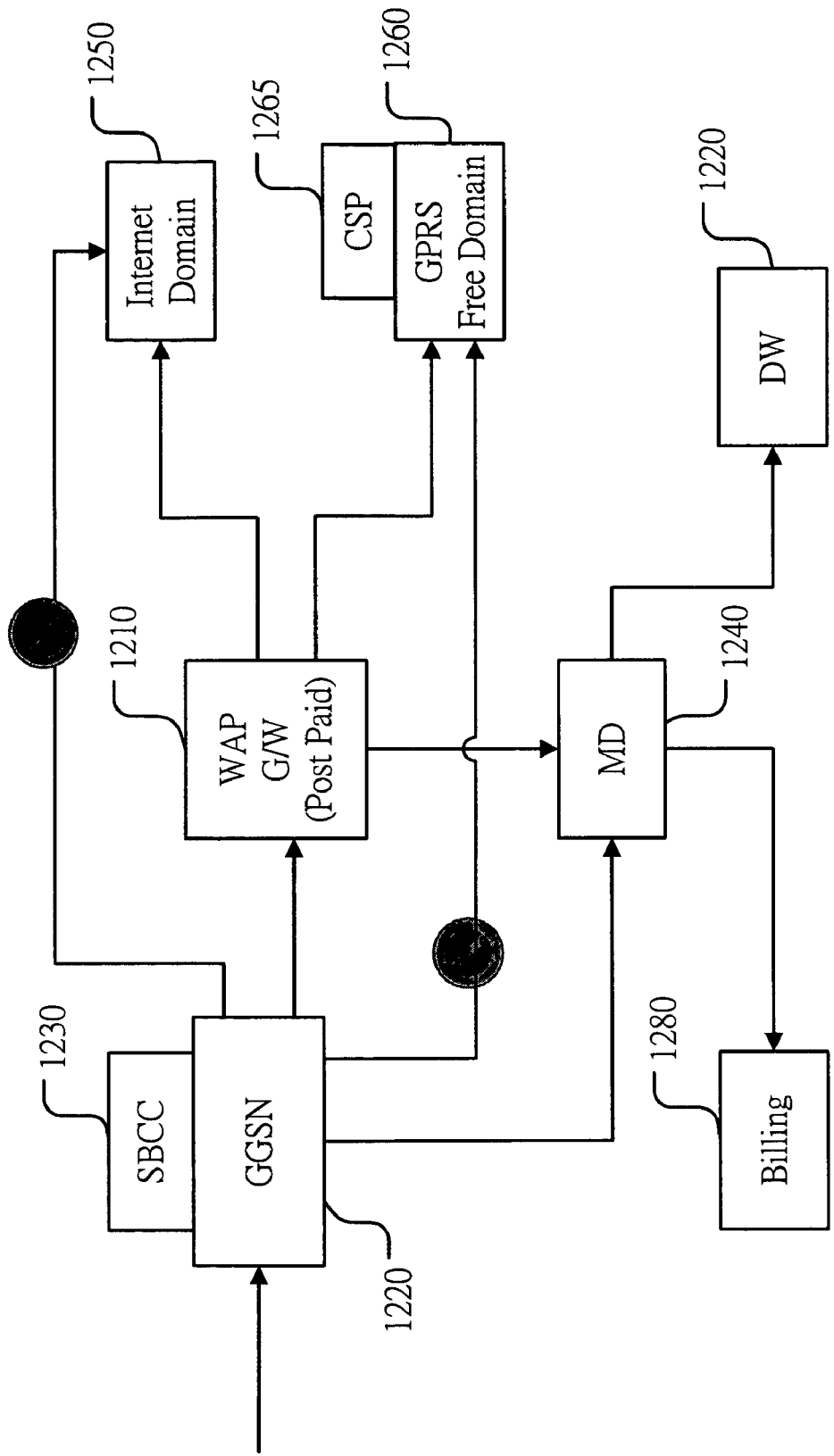
FIG. 12 is a block diagram illustrating a method for content charging for pre-paid subscribers according to an embodiment of the present invention.

Refer to FIG. 12, which is a block diagram illustrating a method for content charging for pre-paid subscribers according to an embodiment of the present invention.

A WAP gateway (pre-paid) IP address is deployed at the GGSN 1220. For the content based charging solution for pre-paid subscribers, the G-CDR comprises traffic by volume through GGSN 1220 to the WAP gateway 1210. The WAP-CDR comprises GPRS free domain traffic by volume through the WAP gateway 1210. These CDR's are provided to the MD 1240 and then filtered to remove the traffic by volume through the GGSN 1220 to the WAP gateway 1210. The MD 1240 provides the content data to the DW 1270.

For pre-paid subscribers, the internet domain 1250 is not available directly through the GGSN 1220.

Additionally, access to GPRS free domain traffic is only available through the WAP gateway 1210 and not directly through the GGSN 1220. The domain name white list comprising a listing of accessible GPRS free domain content for pre-paid subscribers is provided on the WAP gateway 1210.

However, not all traffic through the WAP gateway 1210 to the internet domain 1250 can be prevented and only the domain name white list can be controlled. As a result, the MD 1240 provides any charges from the WAP-CDR for this traffic to the billing system 1280 and the user is post-charged.

Figure 13:
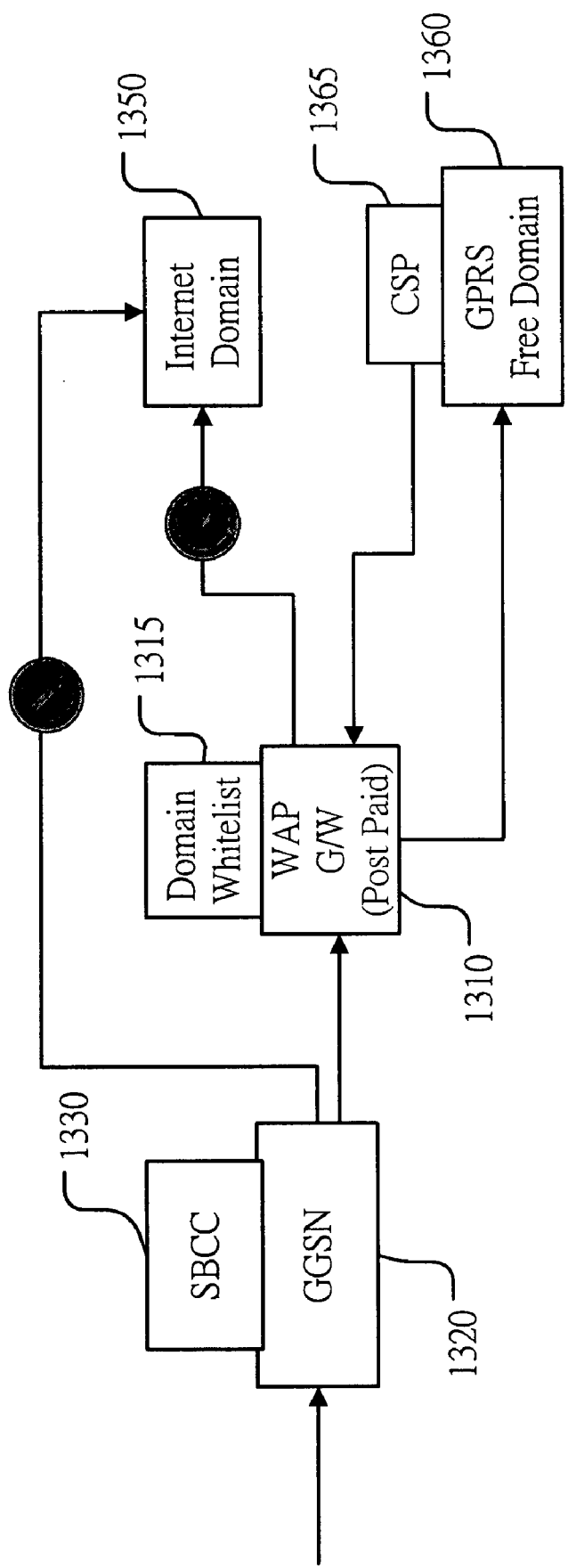
FIG. 13 is a block diagram illustrating access barring for pre-paid subscribers according to an embodiment of the present invention.

Refer to FIG. 13, which is a block diagram illustrating access barring for pre-paid subscribers according to an embodiment of the present invention.

In order to block access to the internet domain 1350 for pre-paid subscribers, users are given a dedicated access point name (APN) to access the GGSN 1320. A WAP gateway (pre-paid) IP address is deployed at the GGSN 1320 and access to the internet domain 1350 is barred by firewall and IP segment. The WAP gateway 1310 is a dedicated WAP gateway for pre-paid users and comprises a domain name white list containing a list of available or accessible content or sites on the free GPRS domain 1360. If the domain name is not on the domain name white list, access is barred. The service platform (SP) 1365 is provided on the GPRS free domain 1360 and communicates appropriate domain name white list information to the WAP gateway 1310.

As described above, not all traffic through the WAP gateway 1310 to the internet domain 1350 can be prevented and only the domain name white list can be controlled. Access is controlled by the domain name white list configuration.

Figure 14:
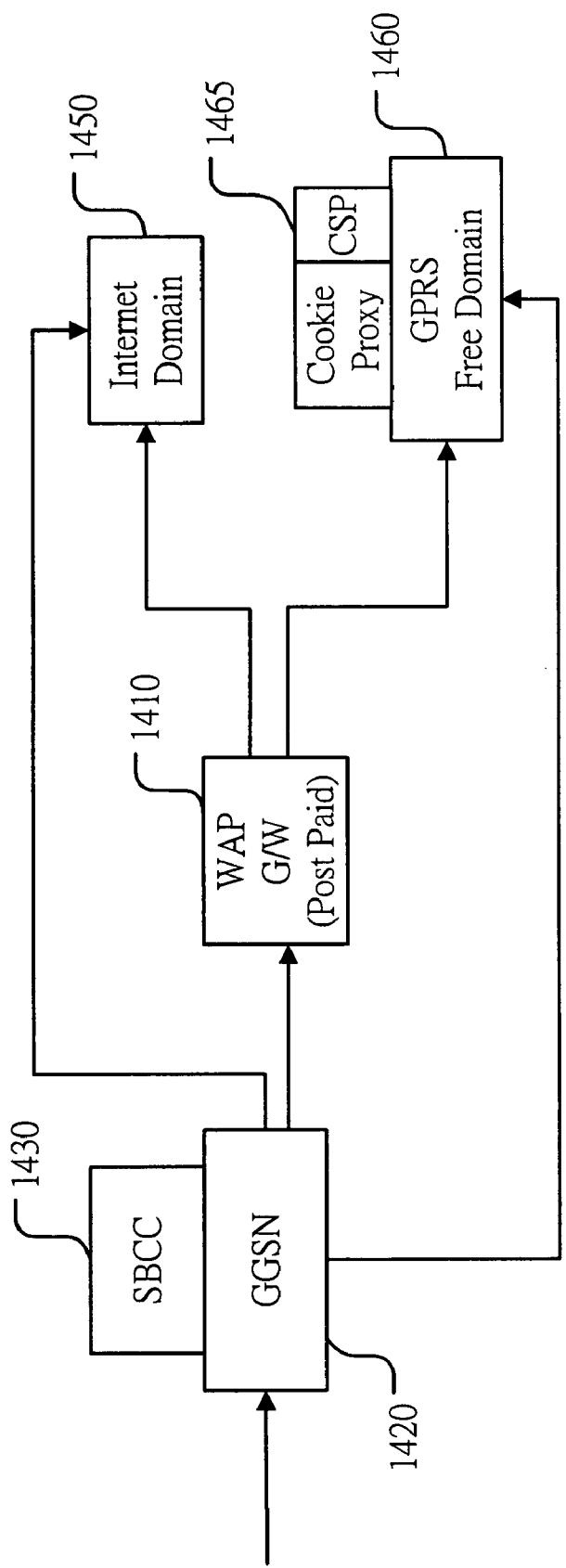
FIG. 14 is a block diagram illustrating HTML browsing from a handset for post-paid subscribers according to an embodiment of the present invention.

Refer to FIG. 14, which is a block diagram illustrating HTML browsing from a handset for post-paid subscribers according to an embodiment of the present invention.

A WAP gateway (post-paid) IP address is deployed at the GGSN 1420. The SP 1465 provides a message telling the user that a packet fee will be charged for HTML content. After which, access to the internet domain 1450 or GPRS free domain 1460 is provided.

Figure 15:
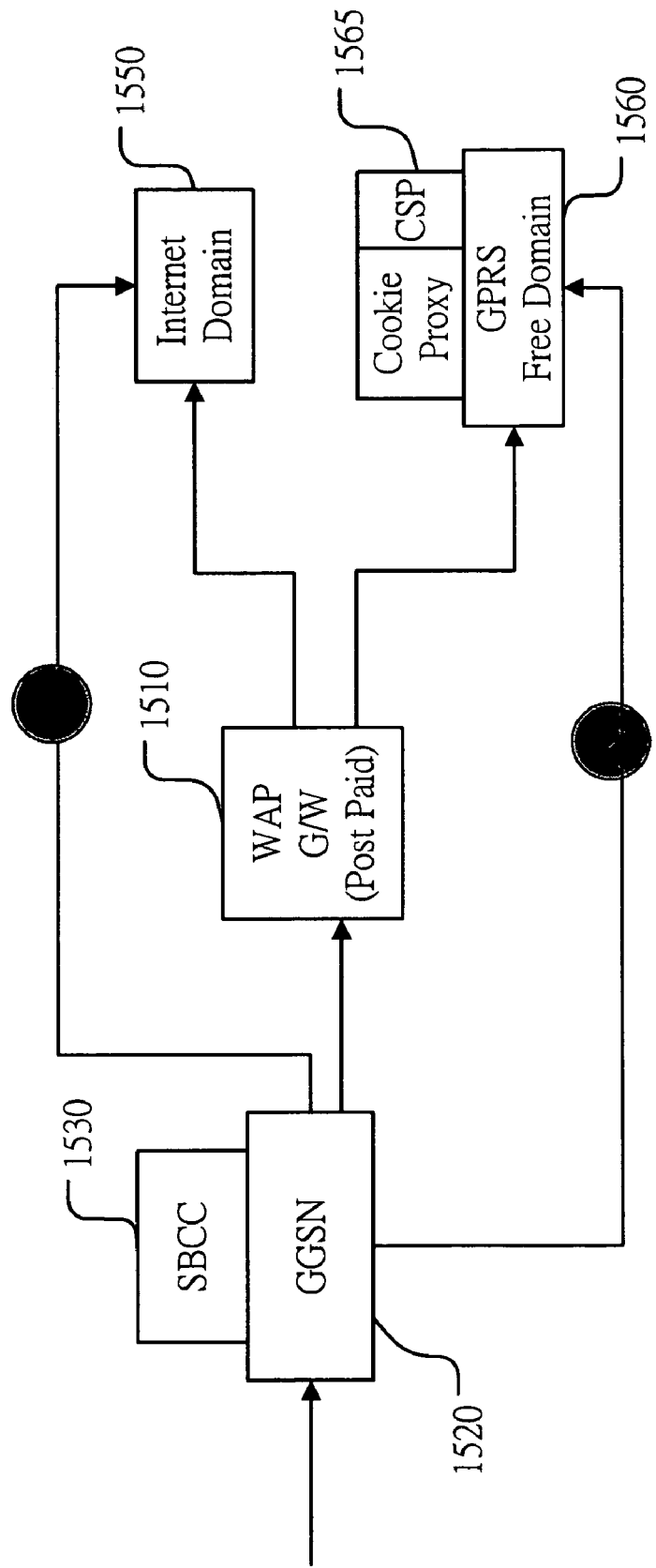
FIG. 15 is a block diagram illustrating HTML browsing from a handset for pre-paid subscribers according to an embodiment of the present invention.

Refer to FIG. 15, which is a block diagram illustrating HTML browsing from a handset for pre-paid subscribers according to an embodiment of the present invention.

A WAP gateway (pre-paid) IP address is deployed at the GGSN 1520. Access to the internet domain 1550, whether through the WAP gateway 1510 or directly through the GGSN 1520 is barred. Additionally, direct access to the GPRS free domain 1560 through the GGSN 1520 is barred and an error message is given indicating destination could not be reached or access to HTML content is denied.

If the domain name is on the domain name white list located on the pre-paid WAP gateway 1510, access to the GPRS free domain 1560 is given to pre-paid users. If the domain name is not on the domain name white list, access is barred.

Since all traffic through the WAP gateway 1510 to the internet domain 1550 can not be prevented, this traffic from the WAP-CDR will be post-charged to the user.

Therefore, in an embodiment of the present invention as illustrated in FIGS. 11, 12, 13, 14, and 15, the present invention comprises: a GGSN with SBCC and URL domain name filtering; a WAP gateway without a URL white list feature but with a domain name white list; a domain name white list on the WAP gateway and a URL white list on the MD; and a MD comprising a G-CDR and WAP-CDR.

Figure 16:
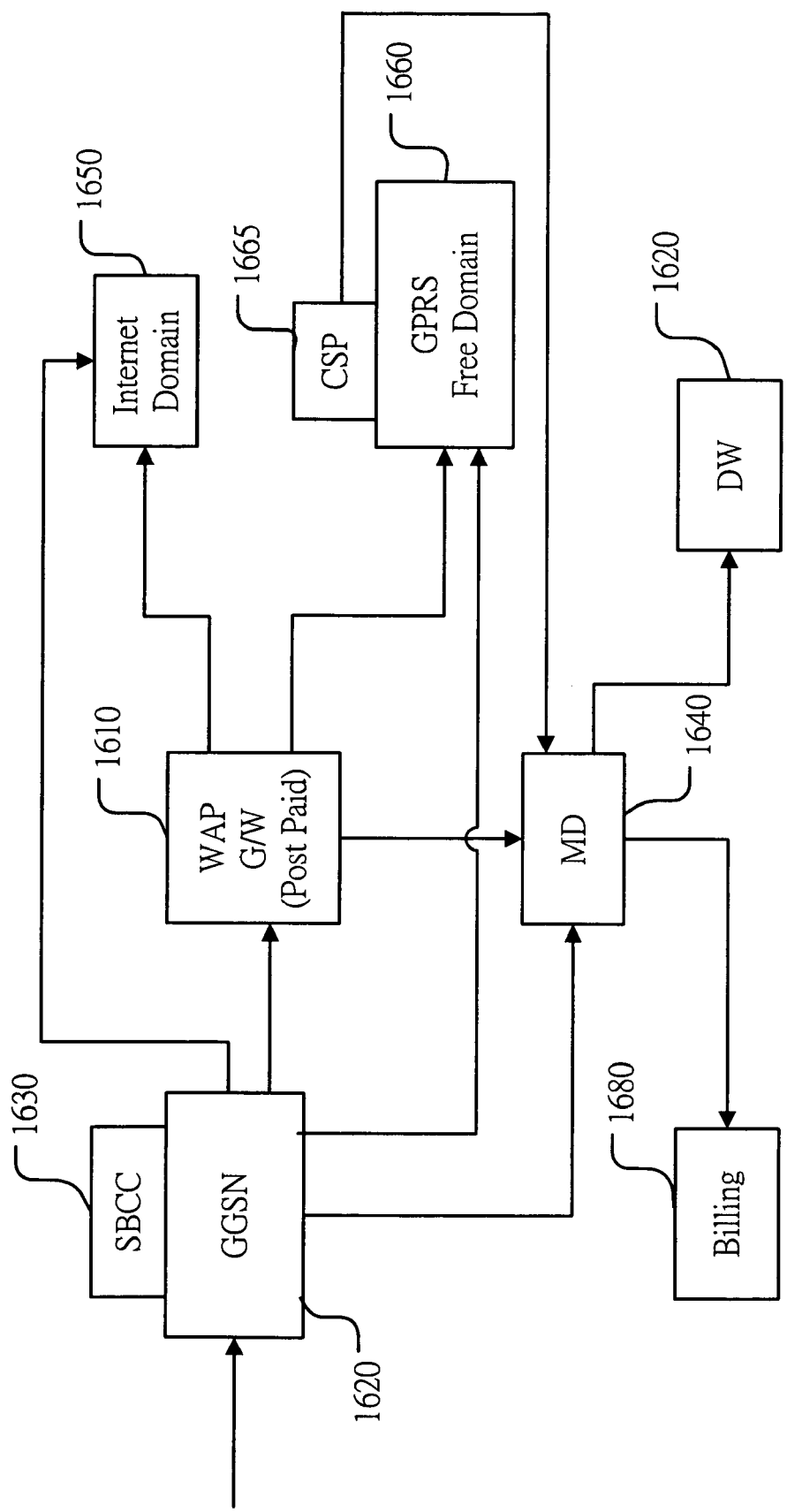
FIG. 16 is a block diagram illustrating a method for content charging according to an embodiment of the present invention.

Refer to FIG. 16, which is a block diagram illustrating a method for content charging according to an embodiment of the present invention.

A WAP gateway (post-paid) IP address is deployed at the GGSN 1620. Access is provided to the internet domain 1650 and GPRS free domain 1660 directly through the GGSN 1620 and to the internet domain 1650 and GPRS free domain 1660 through the WAP gateway 1610. The GGSN 1620 further comprises a service based content charge (SBCC) module 1630 for recording GGSN call detail records.

For the content based charging solution for post-paid subscribers, the GGSN call detail record (G-CDR) comprises internet domain traffic by volume through the gateway GPRS Support Node (GGSN) 1620 to the internet domain 1650, plus traffic by volume to the wireless application protocol (WAP) gateway 1610, plus general packet radio service (GPRS) free domain traffic by volume through GGSN 1620.

The WAP-CDR comprises internet domain traffic by volume through the WAP gateway 1610 plus GPRS free domain traffic by volume through the WAP gateway 1610.

These two CDR's are provided to a mediation gateway (MD) 1640 and then filtered to remove the charge for GPRS free domain traffic by volume through the WAP gateway 1610. The MD 1640 provides the filtered CDR to the billing system 1680 and the content data to the data warehouse (DW) 1670. Therefore, the post-paid subscriber is billed for internet domain traffic by volume through gateway GPRS Support Nodes (GGSN) 1620 to the internet domain 1650, plus internet domain traffic by volume through the WAP gateway 1610, plus GPRS free domain traffic by volume directly through the GGSN 1620. The DW 1670 utilizes the content data to create analysis reports.

In this embodiment of the present invention, a URL white list comprising a listing of accessible GPRS free domain content is located at the MD 1640. The service platform (SP) 1665 is provided on the GPRS free domain 1660 and communicates appropriate URL white list information to the MD 1640.

Figure 17:
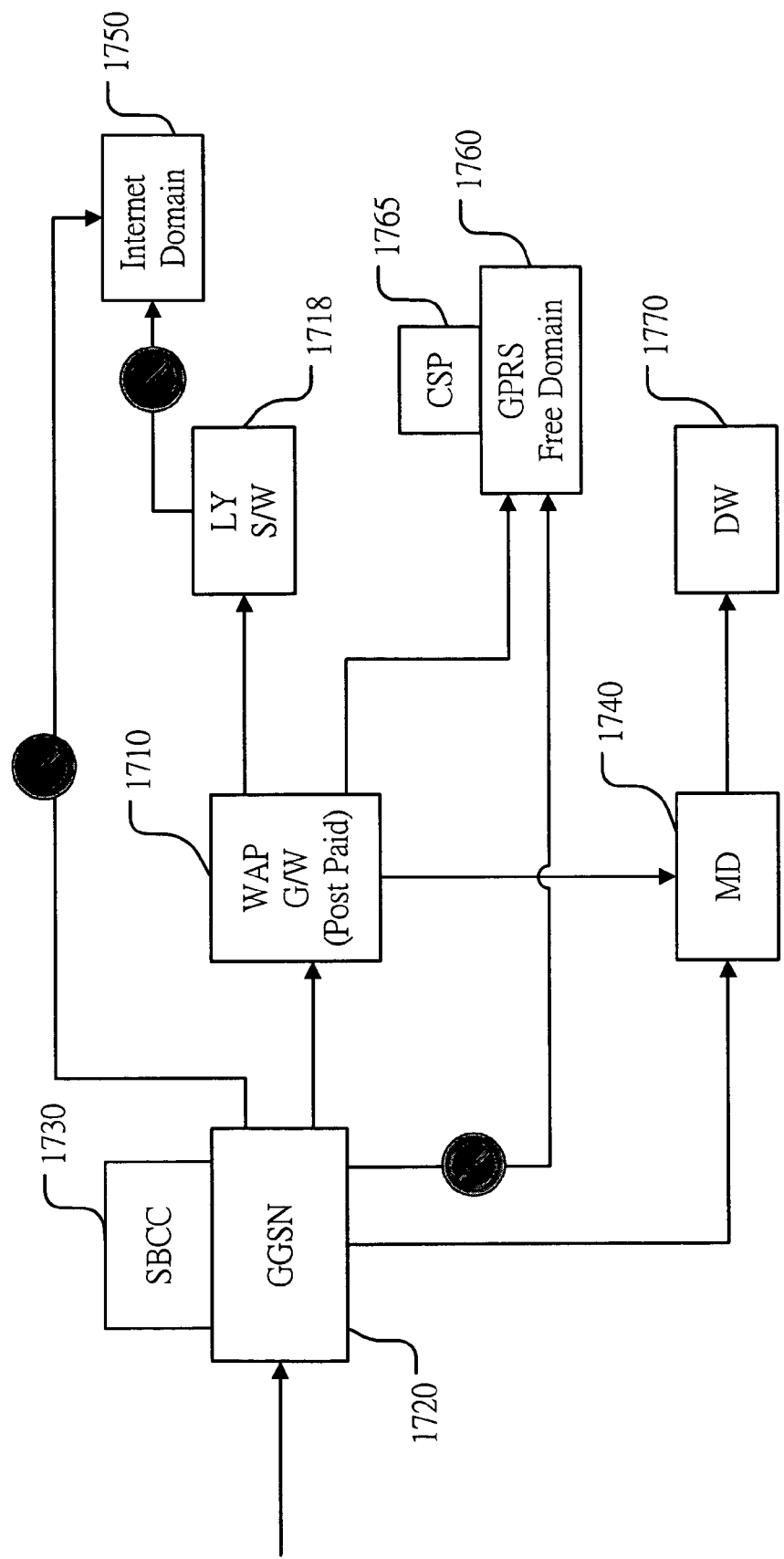
FIG. 17 is a block diagram illustrating a method for content charging for pre-paid subscribers according to an embodiment of the present invention.

Refer to FIG. 17, which is a block diagram illustrating a method for content charging for pre-paid subscribers according to an embodiment of the present invention.

A WAP gateway (pre-paid) IP address is deployed at the GGSN 1720. For the content based charging solution for pre-paid subscribers, the G-CDR comprises traffic by volume through GGSN 1720 to the WAP gateway 1710. The WAP-CDR comprises GPRS free domain traffic by volume through the WAP gateway 1710. These CDR's are provided to the MD 1740 and then filtered to remove the traffic by volume through the GGSN 1720 to the WAP gateway 1710. The MD 1740 provides the content data to the DW 1770.

For pre-paid subscribers, the internet domain is not available directly through the GGSN 1720.

Additionally, access to GPRS free domain traffic is only available through the WAP gateway 1710 and not directly through the GGSN 1720. The domain name white list comprising a listing of accessible GPRS free domain content for pre-paid subscribers is provided on the WAP gateway 1710.

However, not all traffic through the WAP gateway 1710 to the internet domain 1750 can be prevented. Therefore, an L4 switch 1718 acting as a URL white list hub is provided between the WAP gateway 1710 and the internet domain 1750. The L4 switch 1718 prevents inappropriate access through the WAP gateway 1710 to the internet domain 1750.

Figure 18:
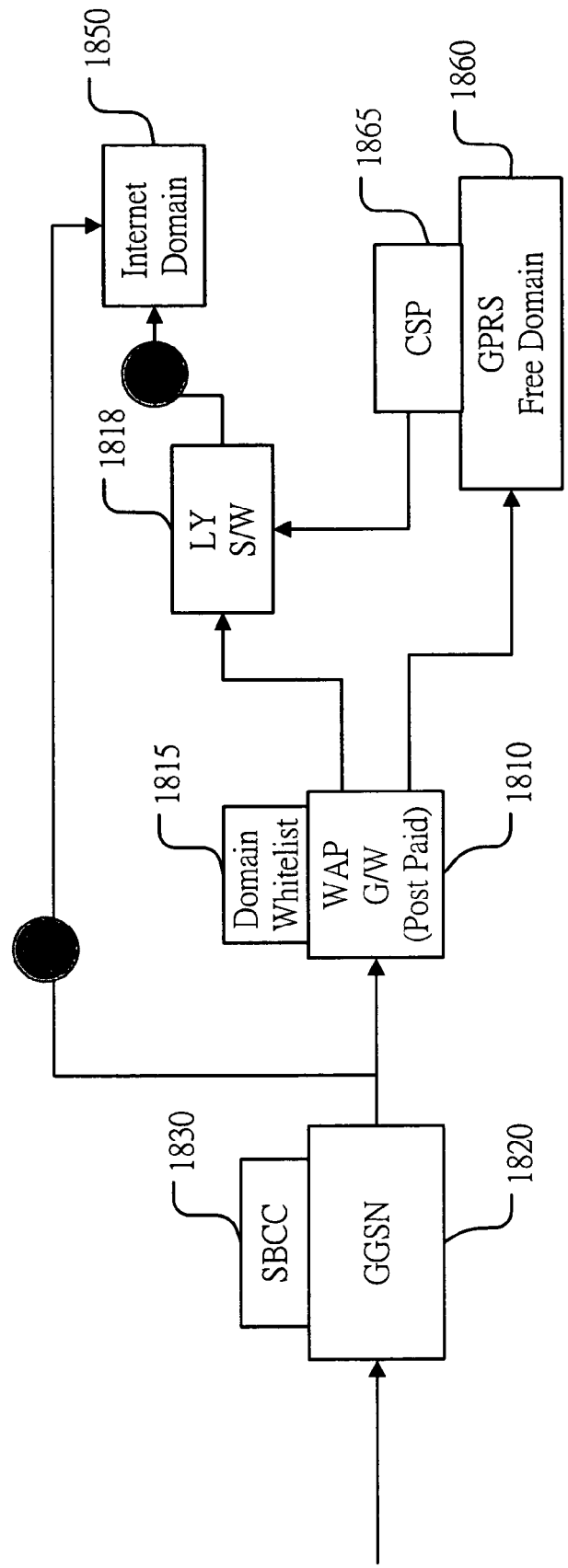
FIG. 18 is a block diagram illustrating access barring for pre-paid subscribers according to an embodiment of the present invention.

Refer to FIG. 18, which is a block diagram illustrating access barring for pre-paid subscribers according to an embodiment of the present invention.

In order to block access to the internet domain 1850 for pre-paid subscribers, users are given a dedicated access point name (APN) to access the GGSN 1820. A WAP gateway (pre-paid) IP address is deployed at the GGSN 1820 and access to the internet domain 1850 is barred by firewall and IP segment. The WAP gateway 1810 is a dedicated WAP gateway for pre-paid users and comprises a domain name white list containing a list of available or accessible content or sites on the free GPRS domain 1860. If the domain name is not on the domain name white list, access is barred. The service platform (SP) 1865 is provided on the GPRS free domain 1860 and communicates appropriate domain name white list information to the WAP gateway 1810.

As described above, not all traffic through the WAP gateway 1810 to the internet domain 1850 can be prevented. Therefore, an L4 switch 1818 acting as a URL white list hub is provided between the WAP gateway 1810 and the internet domain 1850. The L4 switch 1818 prevents inappropriate access through the WAP gateway 1810 to the internet domain 1850. In this embodiment the SP 1865 provides appropriate URL white list information to the L4 switch 1818.

Figure 19:
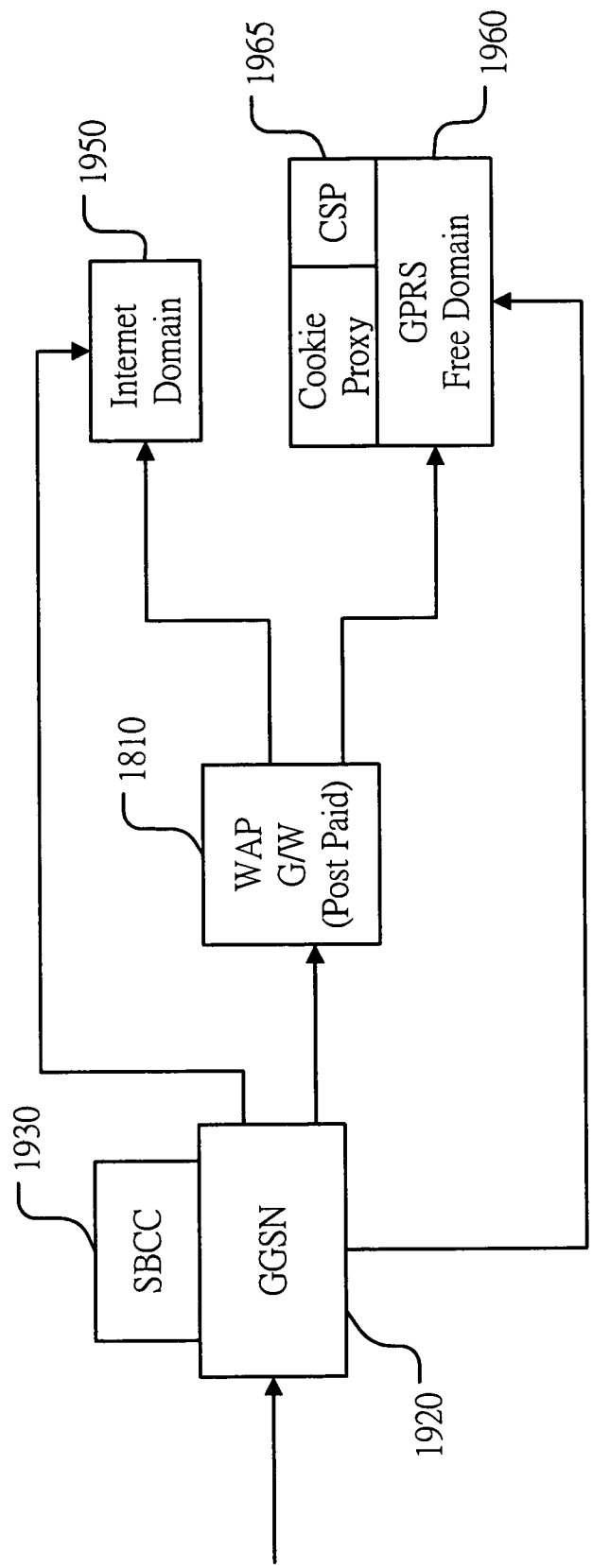
FIG. 19 is a block diagram illustrating HTML browsing from a handset for post-paid subscribers according to an embodiment of the present invention.

Refer to FIG. 19, which is a block diagram illustrating HTML browsing from a handset for post-paid subscribers according to an embodiment of the present invention.

A WAP gateway (post-paid) IP address is deployed at the GGSN 1920. The SP 1965 provides a message telling the user that a packet fee will be charged for HTML content. After which, access to the internet domain 1950 or GPRS free domain 1960 is provided.

Figure 20:
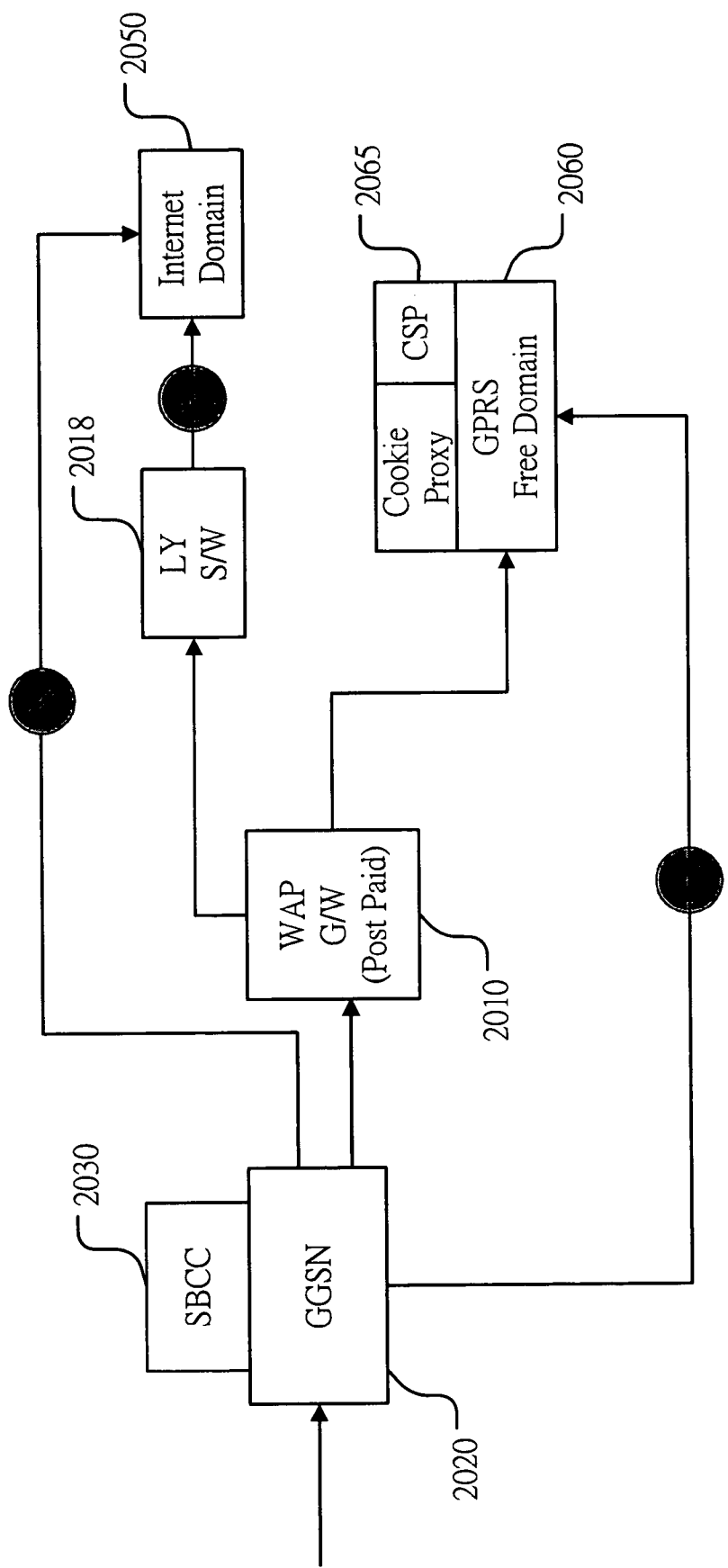
FIG. 20 is a block diagram illustrating HTML browsing from a handset for pre-paid subscribers according to an embodiment of the present invention.

Refer to FIG. 20, which is a block diagram illustrating HTML browsing from a handset for pre-paid subscribers according to an embodiment of the present invention.

A WAP gateway (pre-paid) IP address is deployed at the GGSN 2020. Access to the internet domain 2050, whether through the WAP gateway 2010 or directly through the GGSN 2020 is barred. Additionally, direct access to the GPRS free domain 2060 through the GGSN 2020 is barred and an error message is given indicating destination could not be reached or access to HTML content is denied.

If the domain name is on the domain name white list located on the pre-paid WAP gateway 2010, access to the GPRS free domain 2060 is given to pre-paid users. If the domain name is not on the domain name white list, access is barred.

Since all traffic through the WAP gateway 2010 to the internet domain 2050 can not be prevented, the L4 switch 2018 with URL white list is utilized to bar access to the internet domain 2050.

Therefore, in an embodiment of the present invention as illustrated in FIGS. 16, 17, 18, 19, and 20, the present invention comprises: a GGSN with SBCC and WAP gateway IP and URL domain name filtering; a WAP gateway without a URL white list feature but with a domain name white list; a URL white list on the MD; a layer 4 switch with URL white list configuration for the dedicated pre-paid user WAP gateway; and a MD comprising a G-CDR and WAP-CDR.

Therefore, the present invention provides an accurate, effective, and efficient system for content based charging, access barring, and network browsing, for pre-paid and post-paid subscribers of a wireless mobile communication network system.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A system for charging and controlling access of a wireless mobile communication network system comprising:
   a gateway general packet radio service support node (GGSN) for providing mobile network access, further comprising:
      a service based content charging module for recording a GGSN call detail record;
   a post-paid subscriber wireless application protocol gateway for providing network access for post-paid subscribers;
   a pre-paid subscriber wireless application protocol gateway for providing network access for pre-paid subscribers;
   a management domain for collecting call detail records;
   a billing system for billing customers;
   a data warehouse for creating analysis reports;
   a general packet radio service (GPRS) free domain for providing content, further comprising;
      a service platform for providing a URL white list to the management domain and the pre-paid subscriber wireless application protocol gateway;
      wherein access to an internet domain through the GGSN or pre-paid subscriber wireless application protocol gateway or access to the GPRS free domain is blocked for pre-paid subscribers;
      wherein pre-paid subscribers are only allowed access to network content whose URL is contained in the URL white list; and
      wherein a post-paid subscriber is billed for internet domain traffic by volume through the GGSN to the internet domain, plus internet domain traffic by volume through the WAP gateway, plus GPRS free domain traffic by volume directly through the GGSN.

2. The system for charging and controlling access of a wireless mobile communication network system of claim 1, wherein the URL white list is stored on the management domain and the pre-paid subscriber WAP gateway.

3. The system for charging and controlling access of a wireless mobile communication network system of claim 1, wherein post-paid subscribers are assigned a post-paid WAP gateway IP address by the GGSN.

4. The system for charging and controlling access of a wireless mobile communication network system of claim 1, wherein pre-paid subscribers are assigned a pre-paid WAP gateway IP address by the GGSN.

5. The system for charging and controlling access of a wireless mobile communication network system of claim 1, wherein the management domain collects call detail records from the GGSN and both WAP gateways and provides charges to the billing system after filtering.

6. The system for charging and controlling access of a wireless mobile communication network system of claim 1, wherein the management domain provides content information to the data warehouse.

7. A system for charging and controlling access of a wireless mobile communication network system comprising:
   a gateway general packet radio service support node (GGSN) for providing mobile network access, further comprising:

a service based content charging module for recording a GGSN call detail record;
a post-paid subscriber wireless application protocol gateway for providing network access for post-paid subscribers;
a pre-paid subscriber wireless application protocol gateway for providing network access for pre-paid subscribers;
a management domain for collecting call detail records;
a billing system for billing customers;
a data warehouse for creating analysis reports;
a general packet radio service (GPRS) free domain for providing content, further comprising;
    a service platform for providing a URL white list to the GGSN and the pre-paid subscriber wireless application protocol gateway;
        wherein access to an internet domain through the GGSN or pre-paid subscriber wireless application protocol gateway is blocked for pre-paid subscribers;
        wherein pre-paid subscribers are only allowed access to network content whose URL is contained in the URL white list; and
        wherein a post-paid subscriber is billed for internet domain traffic by volume through gateway GPRS Support Nodes (GGSN) to the internet domain, plus internet domain traffic by volume through the post-paid WAP gateway.

8. The system for charging and controlling access of a wireless mobile communication network system of claim 7, wherein the URL white list is stored on the GGSN and the pre-paid subscriber WAP gateway.

9. The system for charging and controlling access of a wireless mobile communication network system of claim 7, wherein post-paid subscribers are assigned a post-paid WAP gateway IP address by the GGSN.

10. The system for charging and controlling access of a wireless mobile communication network system of claim 7, wherein pre-paid subscribers are assigned a pre-paid WAP gateway IP address by the GGSN.

11. The system for charging and controlling access of a wireless mobile communication network system of claim 7, wherein the management domain collects call detail records from the GGSN and provides charges to the billing system after filtering.

12. The system for charging and controlling access of a wireless mobile communication network system of claim 7, wherein the management domain provides content information to the data warehouse.

13. A system for charging and controlling access of a wireless mobile communication network system comprising:
a gateway general packet radio service support node (GGSN) for providing mobile network access, further comprising:
a service based content charging module for recording a GGSN call detail record;
a post-paid subscriber wireless application protocol gateway for providing network access for post-paid subscribers;
a pre-paid subscriber wireless application protocol gateway for providing network access for pre-paid subscribers;
an L4 switch for preventing access to an internet domain from the pre-paid subscriber wireless application protocol gateway;
a management domain for collecting call detail records;
a billing system for billing customers;
a data warehouse for creating analysis reports;
a general packet radio service (GPRS) free domain for providing content, further comprising;
    a service platform for providing a URL white list to the management domain and a domain name white list to the L4 switch;
        wherein access to an internet domain or GPRS free domain through the GGSN is blocked for pre-paid subscribers;
        wherein pre-paid subscribers are only allowed access to network content whose domain name is contained in the domain name white list; and
        wherein a post-paid subscriber is billed for internet domain traffic by volume through gateway GPRS Support Nodes (GGSN) to the internet domain, plus internet domain traffic by volume through the WAP gateway, plus GPRS free domain traffic by volume directly through the GGSN.

14. The system for charging and controlling access of a wireless mobile communication network system of claim 13, wherein the URL white list is stored on the management domain and the domain name white list is stored on the L4 switch.

15. The system for charging and controlling access of a wireless mobile communication network system of claim 13, wherein post-paid subscribers are assigned a post-paid WAP gateway IP address by the GGSN.

16. The system for charging and controlling access of a wireless mobile communication network system of claim 13, wherein pre-paid subscribers are assigned a pre-paid WAP gateway IP address by the GGSN.

17. The system for charging and controlling access of a wireless mobile communication network system of claim 13, wherein the management domain collects call detail records from the GGSN and both WAP gateways and provides charges to the billing system after filtering.

18. The system for charging and controlling access of a wireless mobile communication network system of claim 13, wherein the management domain provides content information to the data warehouse.

* * * * *